(12) United States Patent
Koga et al.

(10) Patent No.: US 12,338,067 B2
(45) Date of Patent: *Jun. 24, 2025

(54) SYSTEM AND METHOD FOR ELECTRONIC POWER TAKE-OFF CONTROLS

(71) Applicant: Oshkosh Corporation, Oshkosh, WI (US)

(72) Inventors: Jeffrey Koga, Oshkosh, WI (US); Emily Davis, Rochester, MN (US); Clinton T. Weckwerth, Pine Island, MN (US); Vincent Hoover, Byron, MN (US); Zachary L. Klein, Rochester, MN (US); Jerrod Kappers, Oshkosh, WI (US); Derek A. Wente, Austin, MN (US); Logan Gary, Oshkosh, WI (US); Joshua D. Rocholl, Rochester, MN (US); Nader Nasr, Neenah, WI (US); Chad K. Smith, Omro, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/541,293

(22) Filed: Dec. 15, 2023

(65) Prior Publication Data

US 2024/0116705 A1 Apr. 11, 2024

Related U.S. Application Data

(63) Continuation of application No. 17/511,242, filed on Oct. 26, 2021, now Pat. No. 11,851,273, which is a
(Continued)

(51) Int. Cl.
*B60K 1/04* (2019.01)
*B60K 1/02* (2006.01)
(Continued)

(52) U.S. Cl.
CPC ............... *B65F 3/02* (2013.01); *B60K 1/02* (2013.01); *B60K 1/04* (2013.01); *B60K 11/04* (2013.01);
(Continued)

(58) Field of Classification Search
CPC .... B60K 1/04; B60K 2001/0438; B60K 1/02; B60K 11/04; B65F 3/02; B65F 2003/0269; B60L 8/003; H02P 5/74
See application file for complete search history.

(56) References Cited

U.S. PATENT DOCUMENTS

| | | |
|---|---|---|
| 5,378,010 A | 1/1995 | Marino et al. |
| 6,266,598 B1 | 7/2001 | Pillar et al. |

(Continued)

*Primary Examiner* — Jason D Shanske
*Assistant Examiner* — James J Triggs
(74) *Attorney, Agent, or Firm* — FOLEY & LARDNER LLP

(57) ABSTRACT

An electric power take-off system includes a motor configured to convert electrical power received from a battery into hydraulic power, an inverter configured to provide electrical power to the motor from the battery, a heat dissipation device in thermal communication with the inverter, wherein the heat dissipation device includes a thermal fluid pump configured to pump cooling fluid through a plurality of conduits, a flow meter configured determine a flow rate through the plurality of conduits, and a controller configured to receive data from the flow meter and provide operating parameters to the heat dissipation device, wherein the controller is further configured to determine if the data from the flow meter is less than a critical operating condition and decrease the hydraulic power provided by the electric power take-off system in response to determining that the data from the flow meter is less than the critical operating condition.

20 Claims, 27 Drawing Sheets

Related U.S. Application Data continuation of application No. 17/327,273, filed on May 21, 2021, now Pat. No. 11,167,919.

(60) Provisional application No. 63/084,411, filed on Sep. 28, 2020.

(51) Int. Cl.
  *B60K 11/04*    (2006.01)
  *B60L 8/00*     (2006.01)
  *B60L 15/20*    (2006.01)
  *B65F 3/02*     (2006.01)
  *H02P 5/74*     (2006.01)

(52) U.S. Cl.
  CPC ............ *B60L 8/003* (2013.01); *B60L 15/20* (2013.01); *B65F 2003/0269* (2013.01); *B65F 2003/0283* (2013.01); *H02P 5/74* (2013.01)

(56) References Cited

U.S. PATENT DOCUMENTS

| | | |
|---|---|---|
| 6,421,593 B1 | 7/2002 | Kempen et al. |
| 6,553,290 B1 | 4/2003 | Pillar |
| 6,757,597 B2 | 6/2004 | Yakes et al. |
| 6,885,920 B2 | 4/2005 | Yakes et al. |
| 6,909,944 B2 | 6/2005 | Pillar et al. |
| 6,922,615 B2 | 7/2005 | Pillar et al. |
| 6,993,421 B2 | 1/2006 | Pillar et al. |
| 7,006,902 B2 | 2/2006 | Archer et al. |
| 7,024,296 B2 | 4/2006 | Squires et al. |
| 7,072,745 B2 | 7/2006 | Pillar et al. |
| 7,107,129 B2 | 9/2006 | Rowe et al. |
| 7,127,331 B2 | 10/2006 | Pillar et al. |
| 7,162,332 B2 | 1/2007 | Pillar et al. |
| 7,164,977 B2 | 1/2007 | Yakes et al. |
| 7,184,862 B2 | 2/2007 | Pillar et al. |
| 7,184,866 B2 | 2/2007 | Squires et al. |
| 7,254,468 B2 | 8/2007 | Pillar et al. |
| 7,274,976 B2 | 9/2007 | Rowe et al. |
| 7,277,782 B2 | 10/2007 | Yakes et al. |
| 7,302,320 B2 | 11/2007 | Nasr et al. |
| 7,357,203 B2 | 4/2008 | Morrow et al. |
| 7,379,797 B2 | 5/2008 | Nasr et al. |
| 7,392,122 B2 | 6/2008 | Pillar et al. |
| 7,521,814 B2 | 4/2009 | Nasr |
| 7,522,979 B2 | 4/2009 | Pillar |
| 7,555,369 B2 | 6/2009 | Pillar et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,756,621 B2 | 7/2010 | Pillar et al. |
| 7,831,363 B2 | 11/2010 | Quigley |
| 7,848,857 B2 | 12/2010 | Nasr et al. |
| 7,937,194 B2 | 5/2011 | Nasr et al. |
| 7,973,654 B2 * | 7/2011 | Ehrhart .................... B60Q 9/00 56/13.6 |
| 8,000,850 B2 | 8/2011 | Nasr et al. |
| 8,095,247 B2 | 1/2012 | Pillar et al. |
| 8,337,352 B2 | 12/2012 | Morrow et al. |
| 8,561,735 B2 | 10/2013 | Morrow et al. |
| 8,864,613 B2 | 10/2014 | Morrow et al. |
| 9,062,983 B2 | 6/2015 | Zych |
| 9,114,804 B1 | 8/2015 | Shukla et al. |
| 9,132,736 B1 | 9/2015 | Oshkosh |
| 9,290,093 B2 | 3/2016 | Turner et al. |
| 9,376,102 B1 | 6/2016 | Shukla et al. |
| 9,428,042 B2 | 8/2016 | Morrow et al. |
| 9,452,750 B2 | 9/2016 | Shukla et al. |
| 9,821,789 B2 | 11/2017 | Shukla et al. |
| 9,981,803 B2 | 5/2018 | Davis et al. |
| 10,029,556 B2 | 7/2018 | Morrow et al. |
| 10,300,870 B2 | 5/2019 | Da Silva Carvalho et al. |
| 10,315,643 B2 | 6/2019 | Shukla et al. |
| 10,363,823 B2 | 7/2019 | Li et al. |
| 10,392,000 B2 | 8/2019 | Shukla et al. |
| 10,414,385 B2 | 9/2019 | Linsmeier et al. |
| 10,457,134 B2 | 10/2019 | Morrow et al. |
| D869,332 S | 12/2019 | Gander et al. |
| 10,800,605 B2 | 10/2020 | Rocholl et al. |
| 10,843,379 B2 | 11/2020 | Rocholl et al. |
| 10,843,549 B2 | 11/2020 | Morrow et al. |
| 10,858,231 B2 | 12/2020 | Holmes et al. |
| 10,859,167 B2 | 12/2020 | Jax et al. |
| 10,901,409 B2 | 1/2021 | Datema et al. |
| 10,997,802 B2 | 5/2021 | Koga et al. |
| 11,001,135 B2 | 5/2021 | Yakes et al. |
| 11,001,440 B2 | 5/2021 | Rocholl et al. |
| 11,007,863 B2 | 5/2021 | Yakes et al. |
| 11,021,078 B2 | 6/2021 | Rocholl et al. |
| 11,046,329 B2 | 6/2021 | Clifton et al. |
| 11,052,899 B2 | 7/2021 | Shukla et al. |
| 11,059,436 B2 | 7/2021 | Wildgrube et al. |
| 11,097,617 B2 | 8/2021 | Rocholl et al. |
| 11,110,977 B2 | 9/2021 | Smith et al. |
| 11,136,187 B1 | 10/2021 | Koga et al. |
| 11,137,002 B2 | 10/2021 | Clifton et al. |
| 11,148,550 B2 | 10/2021 | Rocholl et al. |
| 11,148,880 B1 | 10/2021 | Koga et al. |
| 11,161,415 B1 | 11/2021 | Koga et al. |
| 11,167,919 B1 * | 11/2021 | Koga ...................... B60L 15/20 |
| 11,254,498 B1 | 2/2022 | Koga et al. |
| 11,254,499 B2 | 2/2022 | Rocholl et al. |
| 11,254,500 B2 | 2/2022 | Buege et al. |
| 11,273,978 B2 | 3/2022 | Buege et al. |
| 11,851,273 B2 * | 12/2023 | Koga ...................... B60L 1/003 |
| 2007/0227801 A1 | 10/2007 | Loeffler |
| 2007/0262637 A1 | 11/2007 | Bennett |
| 2008/0150350 A1 | 6/2008 | Morrow et al. |
| 2008/0215190 A1 | 9/2008 | Pillar et al. |
| 2009/0236156 A1 | 9/2009 | Promersberger et al. |
| 2010/0116569 A1 | 5/2010 | Morrow et al. |
| 2010/0301668 A1 | 12/2010 | Yakes et al. |
| 2011/0117467 A1 * | 5/2011 | Katano ............. H01M 8/04089 429/442 |
| 2011/0312459 A1 | 12/2011 | Morrow et al. |
| 2013/0196806 A1 | 8/2013 | Morrow et al. |
| 2015/0039182 A1 | 2/2015 | Sauter et al. |
| 2018/0265289 A1 | 9/2018 | Davis et al. |
| 2019/0039407 A1 | 2/2019 | Smith |
| 2019/0091890 A1 | 3/2019 | Rocholl et al. |
| 2019/0185077 A1 | 6/2019 | Smith et al. |
| 2019/0193934 A1 | 6/2019 | Rocholl et al. |
| 2019/0291711 A1 | 9/2019 | Shukla et al. |
| 2019/0322321 A1 | 10/2019 | Schwartz et al. |
| 2019/0359184 A1 | 11/2019 | Linsmeier et al. |
| 2019/0360600 A1 | 11/2019 | Jax et al. |
| 2019/0381990 A1 | 12/2019 | Shukla et al. |
| 2020/0039341 A1 | 2/2020 | Morrow et al. |
| 2020/0262366 A1 | 8/2020 | Wildgrube et al. |
| 2020/0265656 A1 | 8/2020 | Koga et al. |
| 2020/0316816 A1 | 10/2020 | Messina et al. |
| 2020/0317083 A1 | 10/2020 | Messina et al. |
| 2020/0346547 A1 | 11/2020 | Rocholl et al. |
| 2020/0346556 A1 | 11/2020 | Rocholl et al. |
| 2020/0346557 A1 | 11/2020 | Rocholl et al. |
| 2020/0346657 A1 | 11/2020 | Clifton et al. |
| 2020/0346854 A1 | 11/2020 | Rocholl et al. |
| 2020/0346855 A1 | 11/2020 | Rocholl et al. |
| 2020/0346856 A1 | 11/2020 | Rocholl et al. |
| 2020/0346857 A1 | 11/2020 | Rocholl et al. |
| 2020/0346858 A1 | 11/2020 | Buege et al. |
| 2020/0346859 A1 | 11/2020 | Buege et al. |
| 2020/0346860 A1 | 11/2020 | Buege et al. |
| 2020/0346861 A1 | 11/2020 | Rocholl et al. |
| 2020/0346862 A1 | 11/2020 | Rocholl et al. |
| 2020/0347659 A1 | 11/2020 | Rocholl et al. |
| 2020/0347661 A1 | 11/2020 | Rocholl et al. |
| 2020/0347857 A1 | 11/2020 | Clifton et al. |
| 2020/0348681 A1 | 11/2020 | Clifton et al. |
| 2020/0348764 A1 | 11/2020 | Clifton et al. |
| 2020/0391582 A1 | 12/2020 | Serrao et al. |
| 2020/0398670 A1 | 12/2020 | Rocholl et al. |
| 2020/0398695 A1 | 12/2020 | Rocholl et al. |

(56) References Cited

U.S. PATENT DOCUMENTS

| | | |
|---|---|---|
| 2020/0398697 A1 | 12/2020 | Rocholl et al. |
| 2020/0398772 A1 | 12/2020 | Wildgrube et al. |
| 2020/0399057 A1 | 12/2020 | Rocholl et al. |
| 2020/0399058 A1 | 12/2020 | Rocholl et al. |
| 2020/0402325 A1 | 12/2020 | Koga et al. |
| 2021/0031611 A1 | 2/2021 | Yakes et al. |
| 2021/0031612 A1 | 2/2021 | Yakes et al. |
| 2021/0031649 A1 | 2/2021 | Messina et al. |
| 2021/0054942 A1 | 2/2021 | Jax et al. |
| 2021/0069934 A1 | 3/2021 | Rocholl et al. |
| 2021/0124347 A1 | 4/2021 | Datema et al. |
| 2021/0188076 A1 | 6/2021 | Morrow et al. |
| 2021/0221216 A1 | 7/2021 | Yakes et al. |
| 2021/0225095 A1 | 7/2021 | Koga et al. |
| 2021/0229755 A1 | 7/2021 | Schwartz et al. |
| 2021/0229908 A1 | 7/2021 | Rocholl et al. |
| 2021/0252995 A1 | 8/2021 | Rocholl et al. |
| 2021/0316740 A1 | 10/2021 | Clifton et al. |
| 2021/0316741 A1 | 10/2021 | Clifton et al. |
| 2021/0323436 A1 | 10/2021 | Rocholl et al. |
| 2021/0323437 A1 | 10/2021 | Rocholl et al. |
| 2021/0323438 A1 | 10/2021 | Rocholl et al. |
| 2021/0323763 A1 | 10/2021 | Koga et al. |
| 2021/0323764 A1 | 10/2021 | Koga et al. |
| 2021/0324880 A1 | 10/2021 | Wente et al. |
| 2021/0325529 A1 | 10/2021 | Koga et al. |
| 2021/0325911 A1 | 10/2021 | Koga et al. |
| 2021/0326550 A1 | 10/2021 | Kappers et al. |
| 2021/0327164 A1 | 10/2021 | Koga et al. |
| 2021/0327170 A1 | 10/2021 | Rocholl et al. |
| 2021/0327237 A1 | 10/2021 | Rocholl et al. |
| 2021/0331635 A1 | 10/2021 | Wildgrube et al. |
| 2021/0331636 A1 | 10/2021 | Wildgrube et al. |
| 2021/0331637 A1 | 10/2021 | Wildgrube et al. |
| 2021/0339632 A1 | 11/2021 | Rocholl et al. |
| 2021/0339648 A1 | 11/2021 | Koga et al. |
| 2021/0339949 A1 | 11/2021 | Rocholl et al. |
| 2021/0345062 A1 | 11/2021 | Koga et al. |
| 2021/0373560 A1 | 12/2021 | Koga et al. |
| 2021/0380179 A1 | 12/2021 | Smith et al. |
| 2021/0396251 A1 | 12/2021 | Clifton et al. |
| 2021/0407222 A1 | 12/2021 | Koga et al. |
| 2022/0009338 A1 | 1/2022 | Yakes et al. |
| 2022/0017063 A1 | 1/2022 | Shukla et al. |
| 2022/0033181 A1 | 2/2022 | Koga et al. |

\* cited by examiner

US 12,338,067 B2

SYSTEM AND METHOD FOR ELECTRONIC POWER TAKE-OFF CONTROLS

CROSS-REFERENCE TO RELATED APPLICATION

This application is a continuation of U.S. patent application Ser. No. 17/511,242, filed Oct. 26, 2021, which is a continuation of U.S. patent application Ser. No. 17/327,273, filed May 21, 2021, which claims priority to U.S. Provisional Patent Application No. 63/084,411, filed Sep. 28, 2020, the entire disclosures of which are hereby incorporated by reference herein.

BACKGROUND

Electric refuse vehicles (i.e., battery-powered refuse vehicles) include one or more energy storage elements (e.g., batteries) that supply energy to an electric motor. The electric motor supplies rotational power to the wheels of the refuse vehicle to drive the refuse vehicle. The energy storage elements can also be used to supply energy to vehicle subsystems, like the lift system or the compactor.

SUMMARY

One exemplary embodiment relates to a refuse vehicle. Refuse vehicle includes a chassis supporting a plurality of wheels, a battery supported by the chassis and configured to provide electrical power to a first motor, wherein rotation of the first motor selectively drives at least one of the plurality of wheels, a vehicle body supported by the chassis and defining a receptacle for storing refuse therein, and an electric power take-off system coupled to the vehicle body. The electric power take-off system includes a second motor configured to convert electrical power received from the battery into hydraulic power, an inverter configured to provide electrical power to the second motor from the battery, a heat dissipation device in thermal communication with the inverter, wherein the heat dissipation device includes a plurality of conduits and a thermal fluid pump configured to pump cooling fluid through the conduits, a thermal sensor configured to detect thermal energy within the inverter, a flow meter configured determine a flow rate of cooling fluid through the conduits, and a controller configured to receive data from the thermal sensor and the flow meter and provide operating parameters to the heat dissipation device, wherein the controller is further configured to determine if the data from the first sensor is greater than a critical operating condition and shut down the electric power take-off system in response to determining that the data from the first sensor is greater than the critical operating condition.

Another exemplary embodiment relates to a method. The method includes providing power to one or more components a system of a refuse vehicle. The refuse vehicle includes a chassis supporting a plurality of wheels, a battery supported by the chassis and configured to provide electrical power to a first motor, wherein rotation of the first motor selectively drives at least one of the plurality of wheels, a vehicle body supported by the chassis and defining a receptacle for storing refuse therein, and an electric power take-off system coupled to the vehicle body, the electric power take-off system including a second motor configured to convert electrical power received from the battery into hydraulic power, an inverter configured to provide electrical power to the second motor from the battery, a heat dissipation device in thermal communication with the inverter, wherein the heat dissipation device includes a plurality of conduits and a thermal fluid pump configured to pump cooling fluid through the plurality of conduits, a thermal sensor configured to detect thermal energy within the inverter, a flow meter configured determine a flow rate of cooling fluid through the plurality of conduits, and a controller configured to receive data from the thermal sensor and the flow meter and provide operating parameters to the heat dissipation device, providing, by the controller, initial operating parameters to the one or more components of the system, receiving, by the controller, the data from at least one of the thermal sensor and the flow meter, shutting down the components of the components of the one or more systems, by the controller, in response to determining the data received is greater than a critical operating condition.

Another exemplary embodiment relates to an electric power take-off system. The electric power take-off system includes a motor configured to convert electrical power received from a battery into hydraulic power, an inverter configured to provide electrical power to the motor from the battery, a heat dissipation device in thermal communication with the inverter, wherein the heat dissipation device includes a plurality of conduits and a thermal fluid pump configured to pump cooling fluid through the plurality of conduits, a thermal sensor configured to detect thermal energy within the inverter, a flow meter configured determine a flow rate of cooling fluid through the plurality of conduits, and a controller configured to receive data from the thermal sensor and the flow meter and provide operating parameters to the heat dissipation device, wherein the controller is further configured to determine if the data from the thermal sensor is greater than a critical operating condition and shut down the electric power take-off system in response to determining that the data from the thermal sensor is greater than the critical operating condition.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
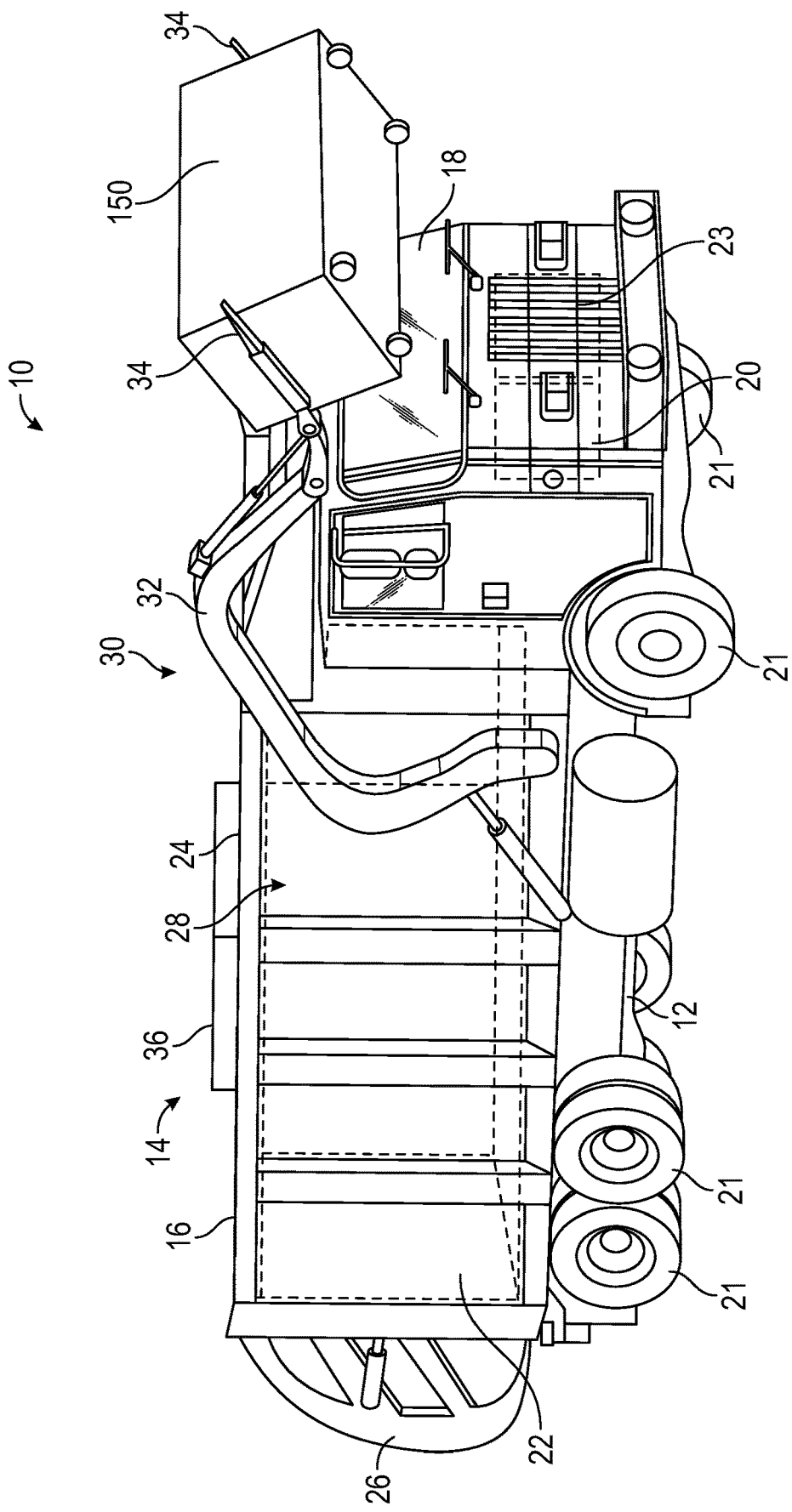
FIG. 1 is a perspective view of a front loading refuse vehicle according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to electric refuse vehicles. Electric refuse vehicles, or E-refuse vehicles, include an onboard energy storage device, like a battery, that provides power to a motor that produces rotational power to drive the vehicle. The energy storage device, which is commonly a battery, can be used to provide power to different subsystems on the E-refuse vehicle. The energy storage device is also configured to provide hydraulic power to different subsystems on the E-refuse vehicle through an electric power take-off (E-PTO) system. The E-PTO system receives electrical power from the energy storage device and provides the electrical power to an electric motor. The electric motor drives a hydraulic pump that provides pressurized hydraulic fluid to different vehicle subsystems, including the compactor and the lifting system.

The E-PTO system may include an E-PTO controller. The E-PTO controller may monitor various systems within the refuse vehicle, including the E-PTO system. The E-PTO controller may receive data from sensors within the system, compare the data to expected values under normal operating conditions, adjust the operation parameters of components of the system, and determine if a critical operating condition exists based on the sensor data. Further, the E-PTO controller may shut down the system and/or the refuse vehicle in response to detecting a critical operating condition.

Referring to FIGS. 1-4, a vehicle, shown as refuse vehicle 10, also referred to as a refuse vehicle 10 throughout the application, (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse vehicle 10 by an operator (e.g., a seat, a steering wheel, hydraulic controls, etc.) as well as components that can execute commands automatically to control different subsystems within the vehicle (e.g., computers, controllers, processing units, etc.). The refuse vehicle 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 is one or more electric motors coupled to the frame 12. The electric motors may consume electrical power from an on-board energy storage device (e.g., batteries 23, ultra-capacitors, etc.), from an on-board generator (e.g., an internal combustion engine), or from an external power source (e.g., overhead power lines) and provide power to the systems of the refuse vehicle 10.

Figure 2:
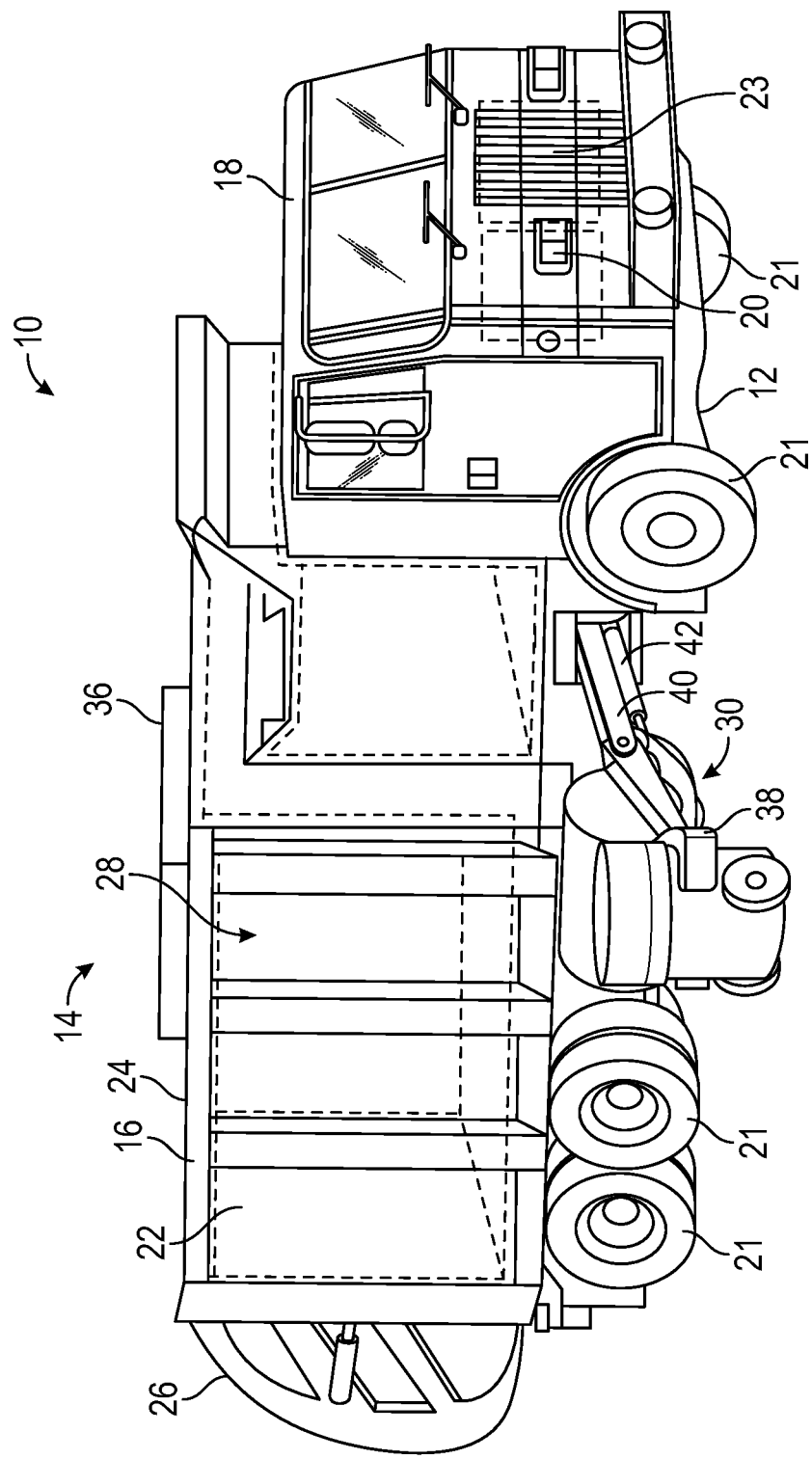
FIG. 2 is a perspective view of a side loading refuse vehicle according to an exemplary embodiment.
Figure 3:
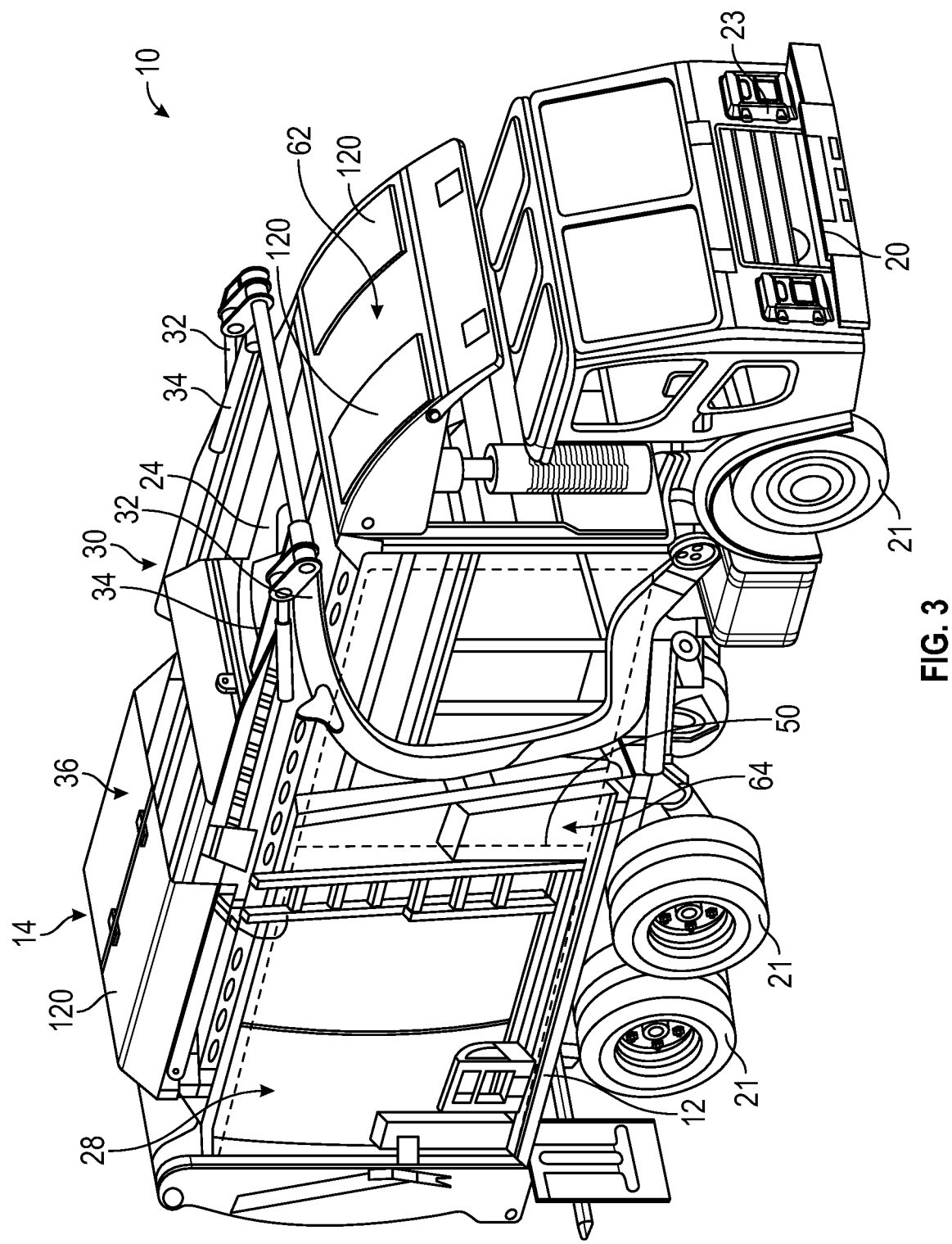
FIG. 3 is a front perspective view of an electric front loading refuse vehicle according to an exemplary embodiment.

According to an exemplary embodiment, the refuse vehicle 10 is configured to transport refuse from various waste receptacles within a municipality to a storage or processing facility (e.g., a landfill, an incineration facility, a recycling facility, etc.). As shown in FIGS. 1-3, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-4, the on-board receptacle 16 and collection chamber 28 are each positioned behind the cab 18. In some embodiments, the collection chamber 28 includes a hopper volume and a storage volume. Refuse is initially loaded into the hopper volume and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse vehicle 10).

Referring again to the exemplary embodiment shown in FIG. 1, the refuse vehicle 10 is a front-loading refuse vehicle. As shown in FIG. 1, the refuse vehicle 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse vehicle 10, the forks 34 are positioned to engage the refuse container (e.g., the refuse vehicle 10 is driven into position until the forks 34 protrude through the apertures within the refuse container). As shown in FIG. 1, the arms 32 are rotated to lift the refuse container over the cab 18. A second actuator (e.g., a hydraulic cylinder articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Referring to the exemplary embodiment shown in FIG. 2, the refuse vehicle 10 is a side-loading refuse vehicle that includes a lifting system, shown as a grabber 38 that is configured to interface with (e.g., engage, wrap around, etc.) a refuse container (e.g., a residential garbage can, etc.). In other embodiments, the refuse vehicle is a rear-loading refuse vehicle. According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42) articulates the arm 40 and positions the grabber 38 to interface with the refuse container. The arm 40 may be movable within one or more directions (e.g., up and down, left and right, in and out, rotation, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Figure 4:
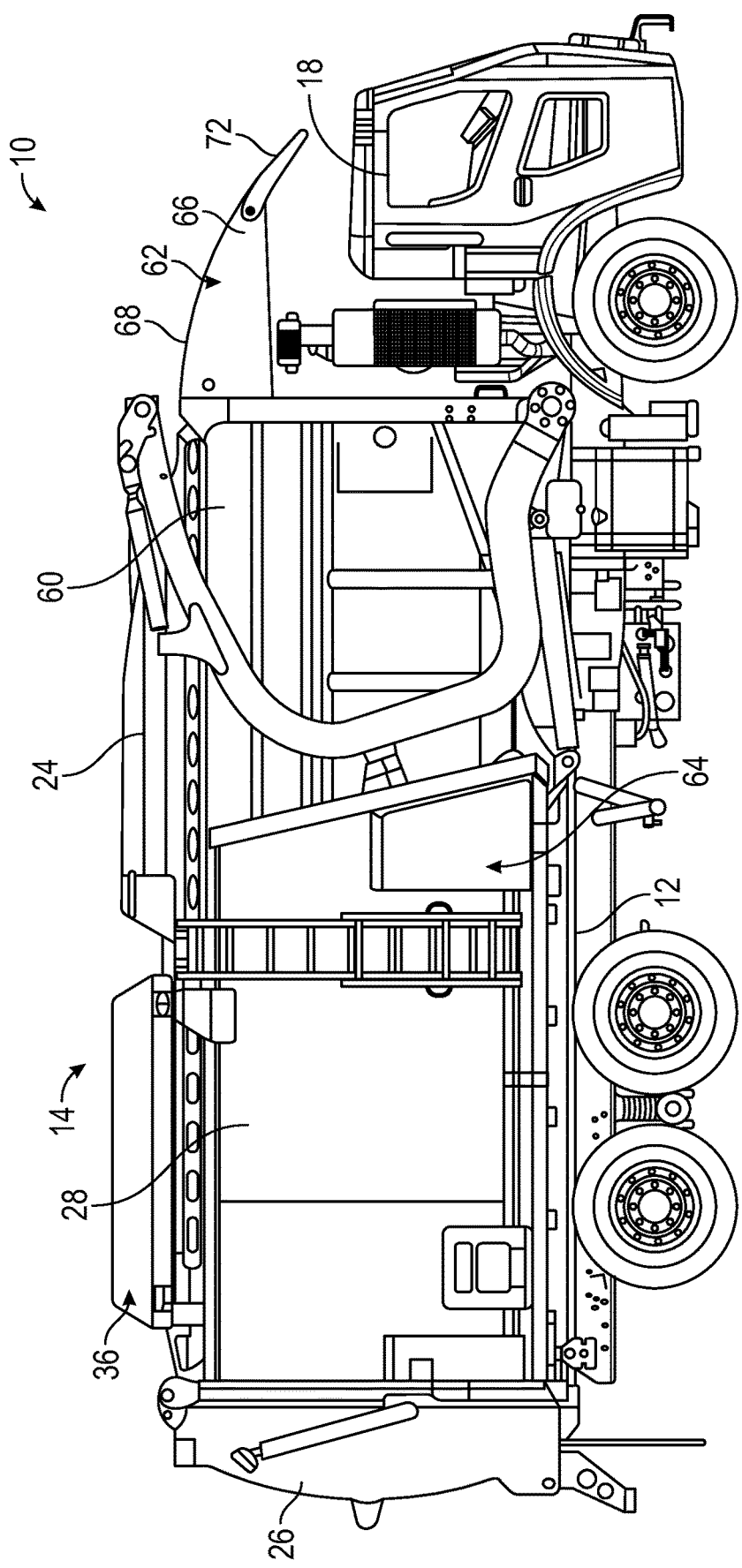
FIG. 4 is a right side view of the electric front loading refuse vehicle of FIG. 3.

Referring to FIGS. 3-4, the refuse vehicle 10 is a front loading electric refuse vehicle 10 (i.e., an E-refuse vehicle). Like the refuse vehicle 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.).

During operation of the refuse vehicle 10, the forks 34 are positioned to engage the refuse container (e.g., the refuse vehicle 10 is driven into position until the forks 34 protrude through the apertures within the refuse container). A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIGS. 3-4, the refuse vehicle 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor) rotates a transmission shaft, which in turn rotates the wheels 21 of the vehicle. The batteries 23 can supply additional subsystems on the refuse vehicle 10, including additional electric motors, cab controls (e.g., climate controls, steering, lights, etc.), the lifting system 30, and/or the compactor 50, for example.

Figure 5:
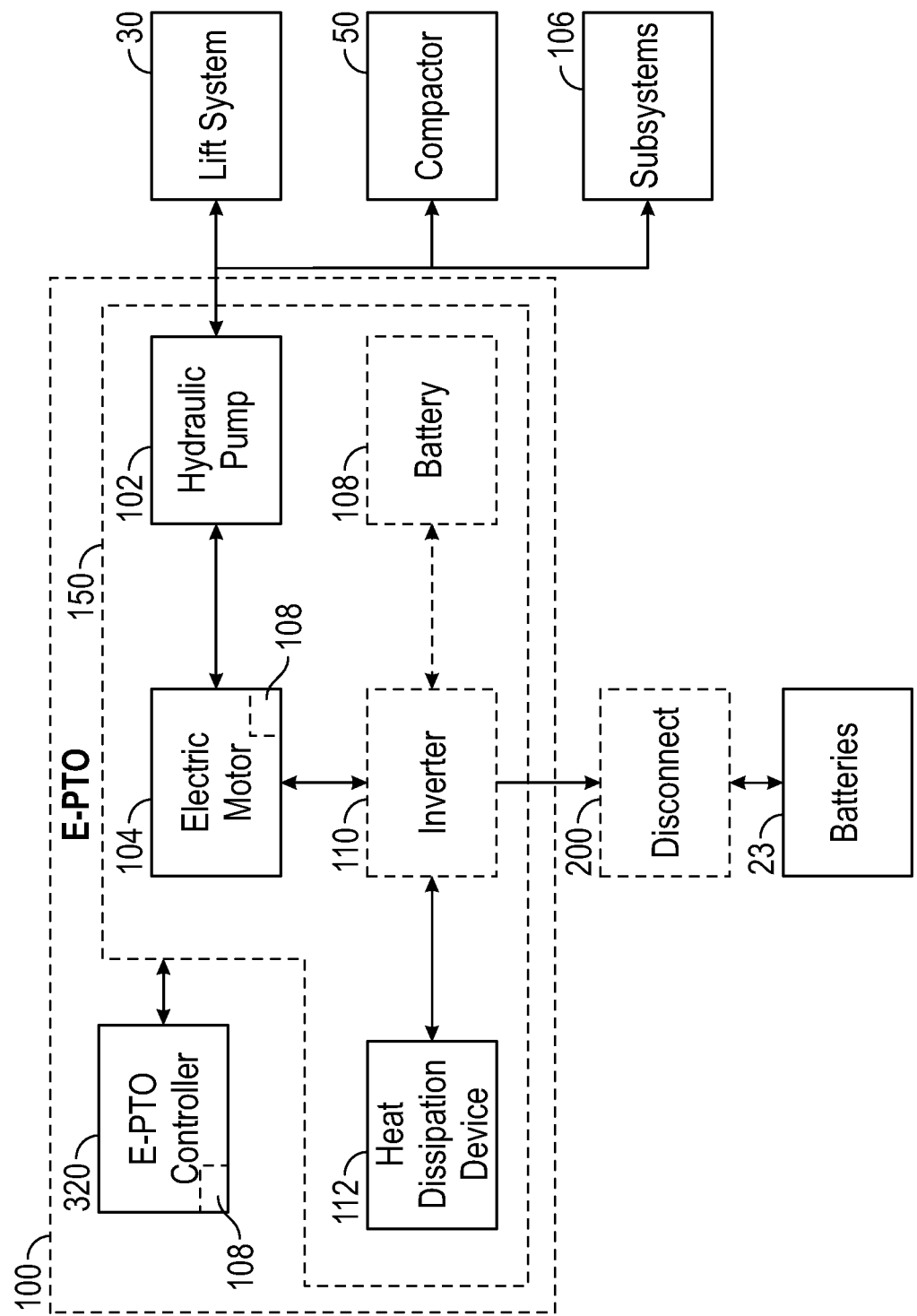
FIG. 5 is a schematic view of a control system of the refuse vehicle of FIG. 3.

The refuse vehicle 10 can be considered a hybrid refuse vehicle as it includes both electric and hydraulic power systems. As depicted in FIGS. 3-5, the refuse vehicle 10 includes an E-PTO system 100. The E-PTO system 100 is configured to receive electrical power from the batteries 23 and/or other power sources (e.g., a secondary battery 108 included in the E-PTO system 100, which may be powered/charged via a solar panel, solar photovoltaic generation, solar thermal energy capture device, heat generation from other parts of the refuse, thermos-electric conversion solar cells, magnet mass moving in electrical coils due to road vibration, piezo-electric conversion, etc.) and convert the electrical power to hydraulic power. The E-PTO system includes an E-PTO sub-system 150 that includes various components of the E-PTO system 100, as will be discussed further herein. The E-PTO system 100 includes an E-PTO controller 320 configured to control and monitor (i.e., by receiving data from sensors) the components of the E-PTO sub-system 150 and various components of the refuse vehicle 10 as will be discussed in greater detail with reference to FIGS. 6A and 6B. The E-PTO controller 320 may include a secondary battery such that the E-PTO controller 320 may operate independently of the battery 23. In some examples, the E-PTO system 100 includes an electric motor 104 driving a hydraulic pump 102. The hydraulic pump 102 pressurized hydraulic fluid onboard the refuse vehicle 10, which can then be supplied to various hydraulic cylinders and actuators present on the refuse vehicle 10. For example, the hydraulic pump 102 can provide pressurized hydraulic fluid to each of the hydraulic cylinders within the lift system 30 on the refuse vehicle. Additionally or alternatively, the hydraulic pump 102 can provide pressurized hydraulic fluid to a hydraulic cylinder controlling the compactor 50. In still further embodiments, the hydraulic pump 102 provides pressurized hydraulic fluid to the hydraulic cylinders that control a position and orientation of the tailgate 26.

As shown in FIG. 3, the refuse vehicle 10 may include one or more energy generating devices 120. For example, the energy generating devices 120 may be solar panels. In other example embodiments, the energy generation devices 120 may include solar cells, solar paneling, solar film, solar photovoltaic generating devices, solar thermal energy capture devices (e.g., a dark surface heat exchange using solar heat to offset electrical energy conversion to hear or a device that captures the heat from the refuse or from the compaction of the refuse and converts the heat to electricity), thermoselectric conversion solar cells, and kinetic energy capture devices (e.g., a magnet mass moving in electrical coils due to road vibration, piezo-electric conversion devices, etc.)

With continued reference to FIG. 5, the refuse vehicle 10 may include a disconnect 200 positioned between the batteries 23 and the E-PTO system 100. The disconnect 200 provides selective electrical communication between the batteries 23 and the E-PTO system 100 that can allow the secondary vehicle systems (e.g., the lift system, compactor, etc.) to be decoupled and de-energized from the electrical power source. For example, the E-PTO controller 320 may cause the disconnect 200 to be decoupled and de-energized from the electrical power source. The disconnect 200 can create an open circuit between the batteries 23 and the E-PTO system 100, such that no electricity is supplied from the batteries 23 to the electric motor 104 or the inverter 110 that is coupled to the electric motor 104 to convert DC power from the batteries 23 to AC power for use in the electric motor 104. Without electrical power from the batteries 23, the electric motor 104 will not drive the hydraulic pump 102. Pressure within the hydraulic system will gradually decrease, such that none of the lifting system 30, compactor 50, or vehicle subsystems 106 relying upon hydraulic power will be functional. The refuse vehicle 10 can then be operated in a lower power consumption mode, given the reduced electrical load required from the batteries 23 to operate the refuse vehicle 10. The disconnect 200 further enables the refuse vehicle 10 to conserve energy when the vehicle subsystems are not needed, and can also be used to lock out the various vehicle subsystems to perform maintenance activities.

The disconnect 200 further allows an all-electric vehicle chassis to be retrofit with hydraulic power systems, which can be advantageous for a variety of reasons, as hydraulic power systems may be more responsive and durable than fully electric systems. In some examples, the E-PTO system 100 includes a dedicated secondary battery 108 that is configured to supply electrical power to the E-PTO system 100 if the disconnect 200 is tripped, such that the secondary vehicle systems can remain optional even when the E-PTO system 100 is not receiving electrical power from the batteries 23. In some examples, the E-PTO system 100 operates independently of the battery 23, and includes its own dedicated secondary battery 108 that supplies DC electrical power to the inverter 110, which converts the DC electrical power to AC electrical power that can then be supplied to the electric motor 104. In still further embodiments, the dedicated secondary battery 108 is directly coupled to the electric motor 104 and supplies DC electrical power directly to the electric motor 104. With the secondary battery 108 present within the E-PTO system 100, the E-PTO system can be agnostic to the chassis type, and can be incorporated into all-electric, hybrid, diesel, CNG, or other suitable chassis types. Further, the dedicated secondary battery 108 may receive power from the energy generating devices 120. In this example, the E-PTO system 100 may be net neutral on energy consumption or even provide energy back to the chassis batteries 23.

In certain embodiments, a heat dissipation device 112 is coupled to the inverter 110. The heat dissipation device 112 (e.g., a radiator, a heat sink, a fan, etc.) is configured to draw heat away from the inverter 110 to reduce the risk of overheating. In certain embodiments, the heat dissipation device 112 is coupled to the inverter 110 via conduits. The conduits may be configured to transport a cooling fluid to and from the inverter 110. In certain embodiments, sensors may be positioned within or adjacent to the conduits. For example, the sensors may be configured to determine the flow rate of the cooling fluid through the conduits and/or the temperature of the cooling fluid flowing through the conduits, as will be discussed further below. It should be appreciated that the heat dissipation device 112 may also be coupled to various other components of the refuse vehicle 10.

Figure 6A:
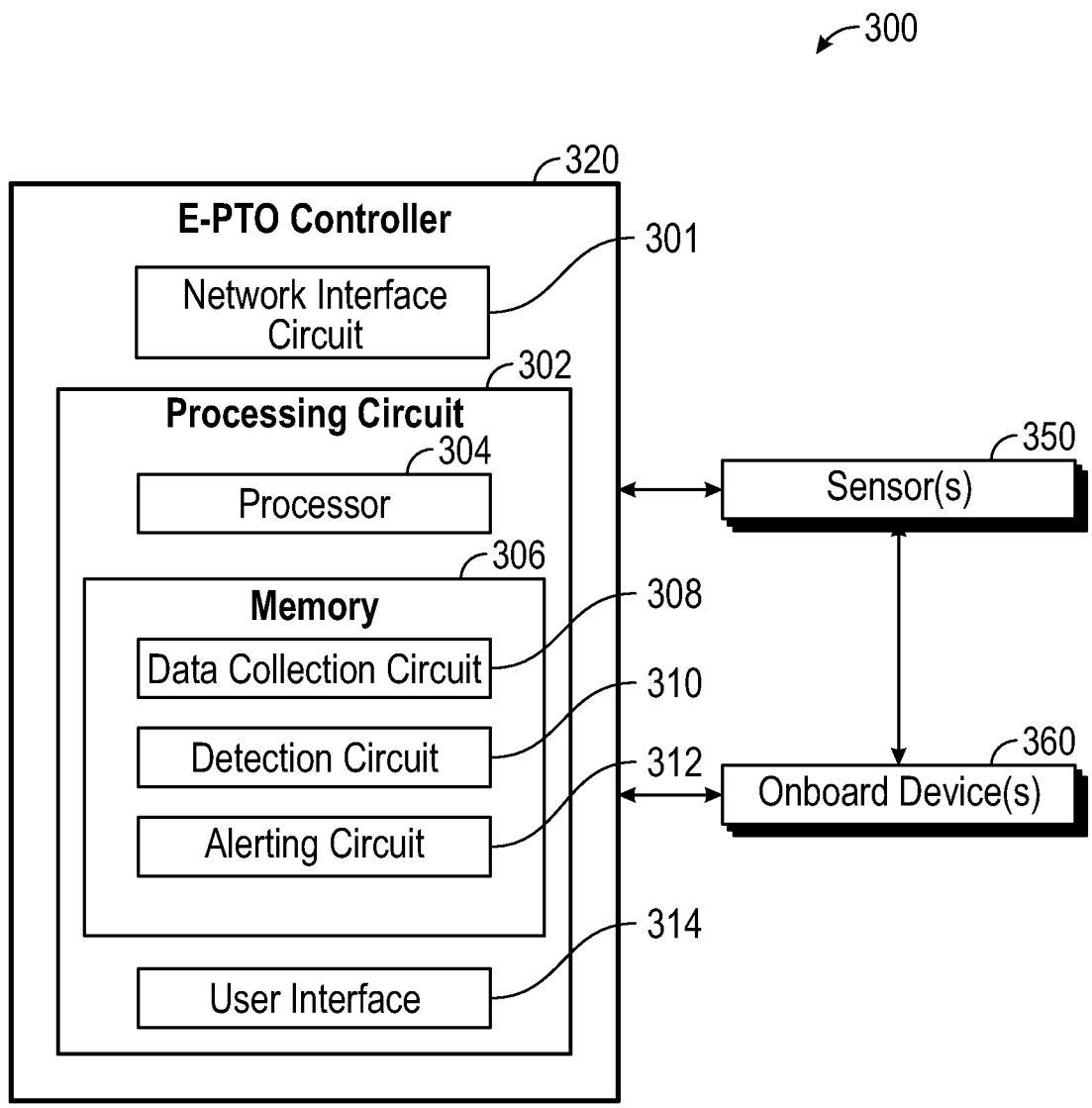
FIG. 6*a* is a schematic view of an E-PTO controller system according to an exemplary embodiment.
Figure 6B:
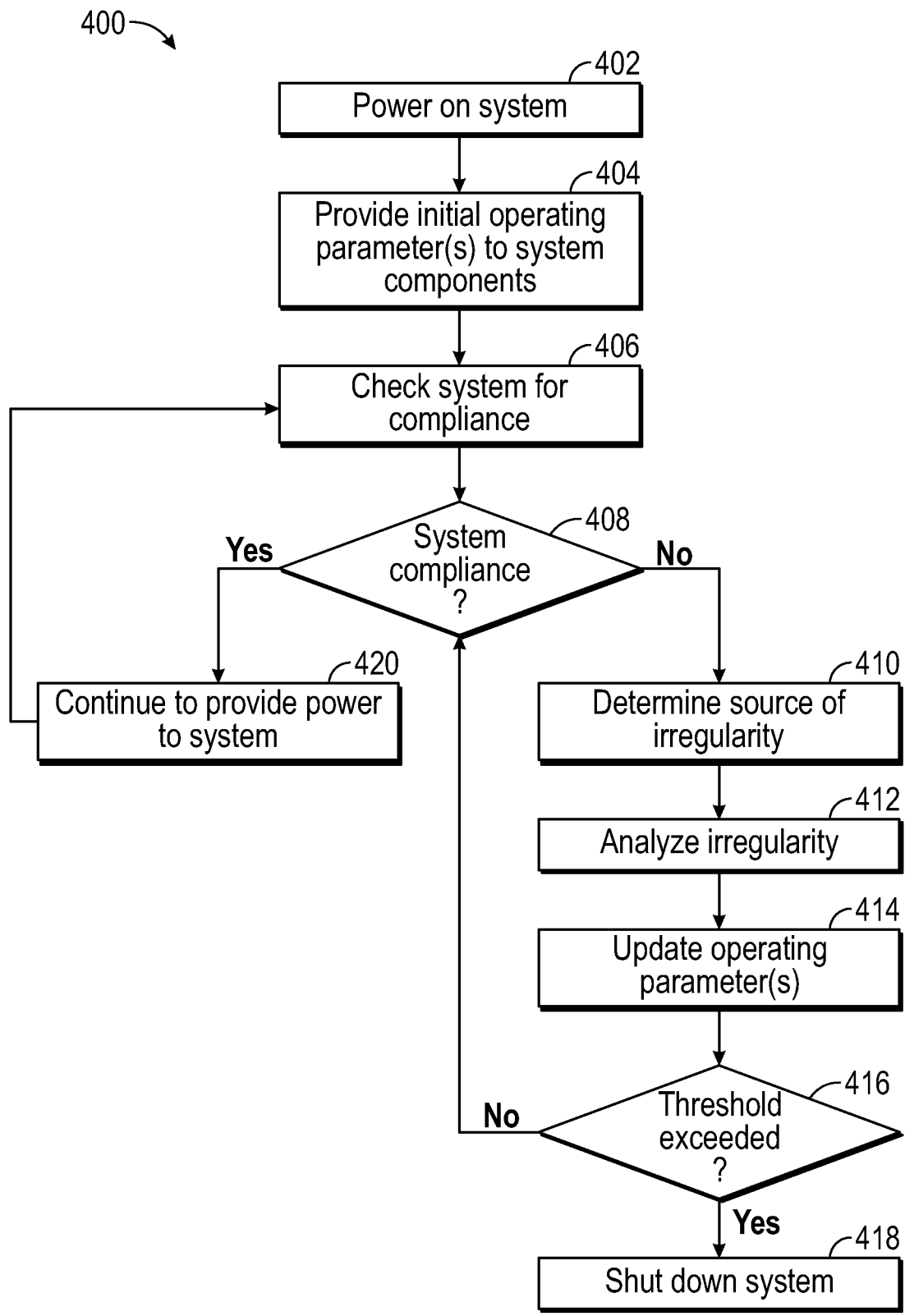
FIG. 6*b* is flow diagram of an E-PTO controller process according to an exemplary embodiment.

Referring now to FIG. 6a, an E-PTO controller system 300 is shown according to an example embodiment. For example, the E-PTO controller system may be implemented and used by the refuse vehicle 10. The E-PTO controller system 300 includes an E-PTO controller 320 (i.e., the E-PTO controller 320 from FIG. 5). The E-PTO controller system 300 may include one or more sensor(s) 350 configured to record data associated with various onboard device(s) 360. The sensor(s) 350 may include any type of sensor that may record data corresponding to the onboard device(s) 360, including a heat sensor, a thermal vision camera, a thermometer, an electric current sensor, pressure sensors, fuel level sensors, flow rate sensors, voltage detectors, noise meters, air pollution sensors, mass flow rate sensors, etc. and any combination thereof. The onboard device(s) includes any equipment that is a part of the refuse vehicle 10, including the batteries 23, the tailgate 26, the lifting system 30, the top door 36, the grabber 38, the hydraulic cylinder 42, the compactor 50, the E-PTO system 100, the hydraulic pump 102, the electric motor 104, the dedicated secondary battery 108, the inverter 110, the heat dissipation device 112, the subsystems 106, E-PTO controller 320, and all sub components thereof.

In certain embodiments, each sensor 350 is configured to record data related to one or more onboard devices 360. For example, one or more a thermal sensors 350 (e.g., thermocouples, resistance temperature detectors, thermistors, semiconductor based on integrated circuits, etc.) may detect and record the temperature of the heat dissipation device 112 and/or the inverter 110. Further, one or more sensors 350 may be within or adjacent to the conduits that connects the heat dissipation device 112 to the inverter 110. In this example, the sensors 350 may determine the temperature and/or the fluid flow rate of the cooling fluid in the conduits. In certain embodiments, more than one sensor 350 is used to record data related to a single onboard device 360. For example, a thermal sensor 350 may detect and record the temperature of the inverter 110 and an electric flow sensor 350 may be used to record the current going into and/or out of the inverter 110.

In various embodiments, the E-PTO controller 320 is communicably coupled to sensor(s) 350, such that the data recorded by the sensor(s) 350 may be saved and analyzed. The E-PTO controller 320 is also communicably coupled to the onboard device(s) 360 such that the E-PTO controller 320 may control the onboard device(s) 360 (e.g., by sending operating parameters to the onboard devices). In certain embodiments, the E-PTO controller 320 includes a network interface circuit 301 configured to enable the E-PTO controller 320 to exchange information over a network. The network interface circuit 301 can include program logic that facilitates connection of the E-PTO controller 320 to the network (e.g., a cellular network, Wi-Fi, Bluetooth, radio, etc.). The network interface circuit 301 can support communications between the E-PTO controller 320 and other systems, such as a remote monitoring computing system. For example, the network interface circuit 301 can include a cellular modem, a Bluetooth transceiver, a radio-frequency identification (RFID) transceiver, and a near-field communication (NFC) transmitter. In some embodiments, the network interface circuit 301 includes the hardware and machine-readable media sufficient to support communication over multiple channels of data communication.

The E-PTO controller 320 is shown to include a processing circuit 302 and a user interface 314. The processing circuit 302 may include a processor 304 and a memory 306. The processor 304 may be coupled to the memory 306. The processor 304 may be a general purpose or specific purpose processor, an application specific integrated circuit (ASIC), one or more field programmable gate arrays (FPGAs), a group of processing components, or other suitable processing components. The processor 304 is configured to execute computer code or instructions stored in the memory 306 or received from other computer readable media (e.g., CDROM, network storage, a remote server, etc.).

The memory 306 may include one or more devices (e.g., memory units, memory devices, storage devices, etc.) for storing data and/or computer code for completing and/or facilitating the various processes described in the present disclosure. The memory 306 may include random access memory (RAM), read-only memory (ROM), hard drive storage, temporary storage, non-volatile memory, flash memory, optical memory, or any other suitable memory for storing software objects and/or computer instructions. The memory 306 may include database components, object code components, script components, or any other type of information structure for supporting the various activities and information structures described in the present disclosure. The memory 306 may be communicably connected to the processor 304 via processing circuit 302 and may include computer code for executing (e.g., by the processor 304) one or more of the processes described herein.

The data collection circuit 308 is configured to collect and store data collected by the sensor(s) 350. For example, the data collection circuit 308 may collect data during operation of the refuse vehicle 10, and store the data. Further, the collection circuit 308 is configured to store operating parameters that the E-PTO controller 320 may provide to onboard devices 360 to control the onboard devices 360. For example, the E-PTO controller 320 may provide operating parameters to the heat dissipation device 112 such that the E-PTO controller 320 may control the cooling fluid flow rate through the conduits. The data collection circuit 308 may also store normal operating conditions corresponding to each sensor 350. For example, the normal operating conditions may include a range of values measured by each sensor 350 that indicates an onboard device 360 is operating properly. For example, if initial operating parameters are provided to an onboard device 360, the normal operating conditions may be the expected senor 350 reading taken with respect to that onboard device 360. Further, the data collection circuit 308 is configured to store threshold measurements for each sensor 350. Each sensor 350 may have a different threshold measurement. In certain embodiments, the threshold measurement may represent both an upper threshold measurement (i.e., the upper bound) and a lower threshold measurement (i.e., a lower bound), such that a sensor 350 measurement below the lower bound or above the upper bound may be indicative of a critical event. The threshold measurement may represent a maximum (i.e., upper bound) and/or minimum acceptable (i.e., lower bound) value that may be detected by a sensor 350. The threshold measurement may depended on each onboard device's 360 demands (i.e., the onboard device 360 that the sensor 350 is monitoring). For example, a sensor 350 may be used to measure the cooling fluid temperature exiting the heat dissipation device 112. A predetermined threshold measurement may be defined for the sensor 350 and if the sensor 350 measures a reading above that threshold measurement, the E-PTO controller 320 may detect a critical operation. For example, the predetermined threshold measurement for the sensor 350 may represent the maximum acceptable temperature that the cooling fluid may safely reach without risking damage to the inverter 110 or the heat dissipation device 112. In another example, a sensor 350 may be used to measure the flow rate of the cooling fluid through the inverter 110. The threshold measurement for the sensor 350 may correspond with the minimum acceptable flow rate of the cooling fluid. For example, if the flow rate dropped below the threshold measurement, the inverter 110 or heat dissipation device 112 may be damaged.

The detection circuit 310 is configured to receive signals from sensor(s) 350 and compare this data to the data stored by the data collection circuit 308. For example, the detection circuit 310 may be able to identify if various components in a system (e.g., the E-PTO system 100, the lifting system 30, the compactor 50, subsystems 106, etc.) is in compliance (i.e., operating within the normal operating condition bounds). The detection circuit 322 is also configured to determine if a sensor 350 reading exceeds the threshold measurement. For example, detection circuit 310 may determine the presence of a critical operating condition if a sensor 350 detects the temperature of the inverter 110, or a region thereof, exceeds a predetermined threshold temperature. In some embodiments, detection circuit 310 detects a location of a critical operating condition. For example, detection circuit 310 may determine a critical operating condition is occurring in the inverter 110 because a sensor 350 detecting a temperature over the threshold temperature located proximate the inverter 110. In some embodiments, if the detection circuit 310 detects a critical operating condition, the critical operating condition, and the circumstances surrounding it, is communicated to the alerting circuit 312.

Alerting circuit 312 is configured to perform one or more operations in response to receiving an indication of a critical operating condition. In some embodiments, alerting circuit 312 presents an indication of the critical operating condition to an operator of refuse vehicle 10. For example, alerting circuit 312 may control a user interface 314 to display a warning to an operator of refuse vehicle 10.

The user interface 314 is configured to present information to and receive information from a user. In some embodiments, user interface 314 includes a display device (e.g., a monitor, a touchscreen, hud, etc.). In some embodiments, user interface 314 includes an audio device (e.g., a microphone, a speaker, etc.). In various embodiments, user interface 314 receives alerts from alerting circuit 312 and presents the alerts to an operator of refuse vehicle 10. For example, user interface 314 may receive a visual alert from alerting circuit 312 and display a graphic on a display device to alert an operator of refuse vehicle 10 of a critical operating condition and the location of the critical operating condition associated with the refuse vehicle 10.

Figure 7:
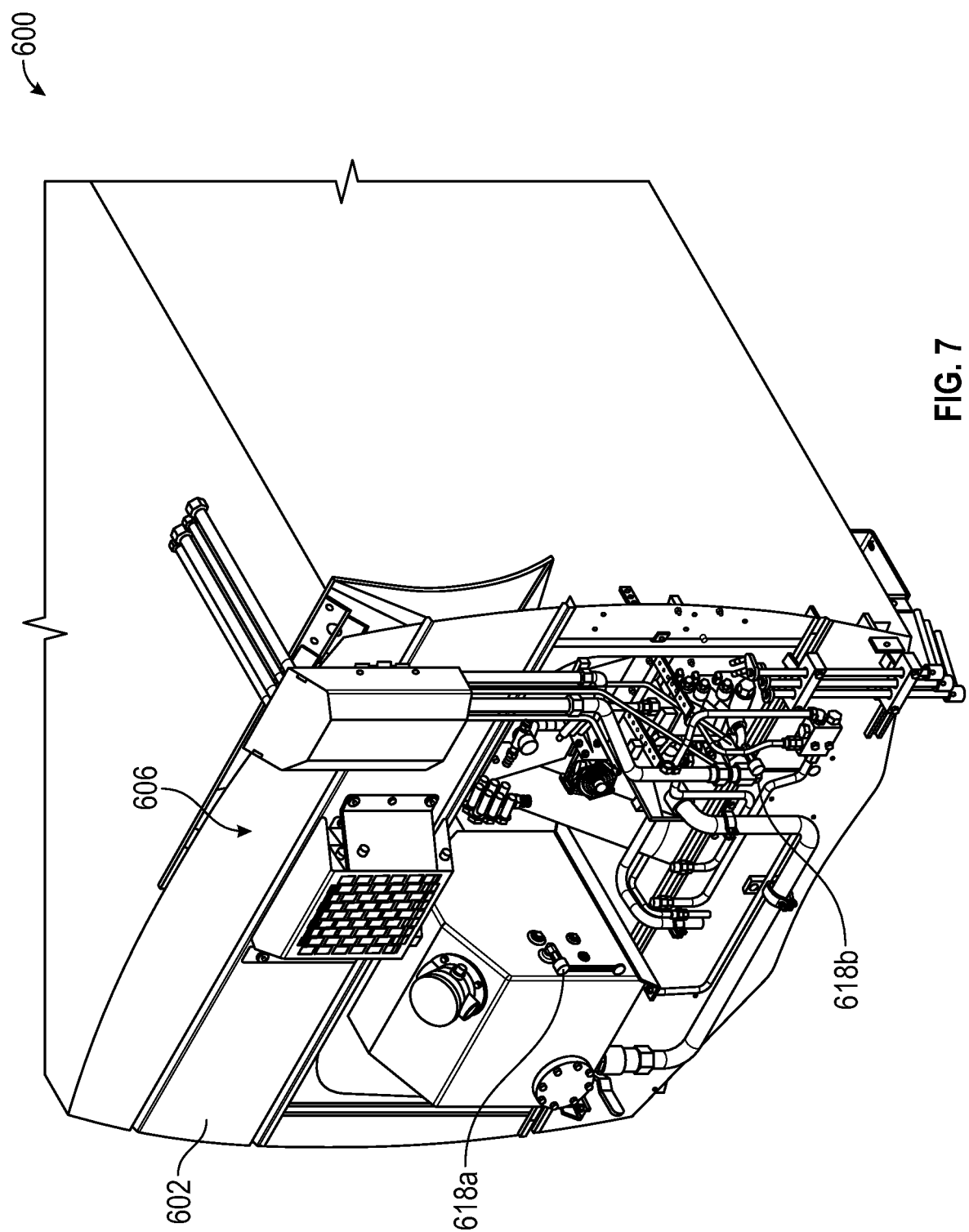
FIG. 7 is a perspective view of an E-PTO system according to an example embodiment.

In some embodiments, alerting circuit 312 operates refuse vehicle 10. For example, alerting circuit 312 may cause the E-PTO system 100 and/or the chassis of the refuse vehicle 10 to shut down and/or alter operation in response to a critical operating condition being detected with respect to a component of the E-PTO system 100. For example, if the cooling fluid flow rate through the inverter 110 is sensed (i.e., by a sensor 350) to be below a threshold measurement (i.e., as determined by the detection circuit 310), the alerting circuit 312 may cause the entire E-PTO system 100 to be shut down. Further, the alerting circuit 312 may cause the entire refuse vehicle 10 to shut down in response receiving an indication of a critical operating condition. Additionally or alternatively, alerting circuit 312 may transmit one or more notifications. For example, alerting circuit 213 may transmit a notification to the network interface circuit 301, such that a notification may be sent via the network to a fleet monitoring system that monitors the status of various refuse vehicles 10. Additionally or alternatively, alerting circuit 312 may cause the E-PTO system 100 to shut down and/or alter operation in response to chassis data (e.g., data collected from sensors onboard the chassis, etc.). Referring now to FIG. 7, am E-PTO controls process 400 is shown according to an exemplary embodiment. For example, the process 400 may be performed by the E-PTO controller 320. The process 400 begins with process 402. Process 402 involves powering on a system. For example, the system may be the E-PTO system 100, the lift system 30, the compactor 50, any of the subsystems 106, and/or any other system included in the refuse vehicle 10. The power may be supplied to the system by the battery 23 and/or a secondary battery 108. In certain example embodiments, the E-PTO controller 320 may cause power to be supplied to the system. However, in other embodiments, another component (e.g., a start button) of the refuse vehicle 10 may cause power to be supplied to the system.

Once power is provided to the system as a part of process 402, initial operating parameters may be provided to the system components as a part of process 404. For example, the E-PTO controller 320 may provide initial operating parameters to the system components (e.g., the lift system 30, the compactor 50, the subsystems 106, the hydraulic pump 102, the electric motor 104, the battery 107, the inverter 110, the heat dissipation device 112, etc.). The initial operating parameters may correspond with expected performance characteristics of the system. For example, an initial operating parameter may be provided to the heat dissipation device 112 that defines a specific power input into a pump included in the heat dissipation device. The specific power input may correspond with an expected cooling fluid flow rate through the heat dissipation device 112. For example, a greater specific power input (i.e., as defined by the operating parameter) into the pump may lead to a higher the expected cooling fluid flow rate through the heat dissipation device 112. The initial operating parameters may be predetermined based on modeling, testing, and/or prior performance of the system.

After the initial operating parameters are provided to the system components, the E-PTO controller 320 checks to see if the system is in compliance at process 406. For example, the E-PTO controller 320 controller may receive data from sensor(s) 350 monitoring the various components of the system. The detection circuit 310 may then compare the data from the sensor(s) to normal operating conditions stored in the data collection circuit 308 to determine if the sensor readings are within the normal operating conditions bounds. If so, the system may be determined to be in compliance at decision 408. If not, the system may be determined to not be in compliance at decision 408. If the system is in compliance, power may continue to be supplied to the system as a part of process 420, allowing the system to continue to operate. Data may continue to be collected by the sensor(s) 350, and the process 400 may return to process 406 such that the E-PTO controller 320 may continue to monitor the system to ensure that the system is in compliance.

If the detection circuit 310 determines that the system is not in compliance at decision 408, the process 400 may proceed to process 410. At process 410, the source of the irregularity is determined. For example, the E-PTO controller 320 may be able to determine the source of irregularity based on which sensor(s) 350 are collecting data outside the normal operation bounds. For example, if a heat sensor 350 is configured to measure the temperature of the inverter 110, and the inverter 110 temperature exceeds the normal operating temperature upper bound, then the detection circuit 310 may determine the source of the irregularity to be the heat dissipation device 112 because the heat dissipation device 112 is configured to cool the inverter 110. However, the detection circuit 310 may also analyze the data from sensors 350 configured to monitor the heat dissipation device 112. For example, if a flow meter sensor 350 (e.g., a Coriolis meter, a differential pressure meter, a magnetic meter, a multiphase meter, a turbine meter, an ultrasonic meter, a vortex meter, a positive displacement meter, an electromagnetic flow meter, etc.) indicates that the fluid flow rate of the cooling fluid is within the normal operating bounds and a heat sensor 350 indicates that the cooling fluid is at a temperature within the normal operating bounds, then the detection circuit 310 may determine that the source of irregularity is the inverter 110. Once the source of irregularity is determined as a part of process 410, the irregularity is analyzed at process 412.

Process 412 includes analyzing the irregularity. For example, the detection circuit 310 may compare the irregular data received from the sensor 350 and compare this to the expected data for normal operating conditions. The detection circuit 310 may then analyze the irregularity to determine if the data is greater than the upper bound of normal operating conditions or less than the lower bound of normal operating conditions. Once this is determined, the detection circuit 310 may determine updated operating parameters at process 414. For example, if a heat sensor 350 coupled to the inverter provides the detection circuit 310 with a temperature reading that is greater than the upper bound of the normal operating conditions, analyzing this irregularity at process 412 may indicate that a higher cooling fluid flow rate from the heat dissipation device 112 may be needed. Thus, the detection circuit 310 may update the operating parameter for the heat dissipation device 112 to increase the amount of power being supplied to the pump within the heat dissipation device 112 such that the cooling fluid flow rate increases, which may be confirmed by a flow rate sensor 350 in the conduit connecting the heat dissipation device 112 to the inverter 110. After updating the operating parameters, the detection circuit 310 may continue to monitor data from the sensor(s) 350. This data may then be analyzed at decision 416 to determine if a threshold is exceeded (i.e., a critical operating condition exists). For example, an upper critical operating condition bound and a lower critical operating condition bound may exist for each sensor 350. The upper critical operating bound may be higher than the upper normal operating bound and the lower critical operating bound may be less than the lower normal operating bound.

If it is determined that the threshold is not exceed at decision 416, the process 400 returns to decision 408 to determine if the system is in compliance. If not, process 410, 412, and 414 may be repeated, thereby creating a feedback loop (e.g., a PID feedback control loop) in an attempt to bring the system within the bounds of the normal operating conditions. However, if it is determined that a threshold is exceeded at decision 416, the detection circuit 310 may send an indication of the critical operating condition to the alerting circuit 312. The alerting circuit may then cause the system or any components thereof to shut down as a part of process 418. Further, the alerting circuit 312 may cause the entire refuse vehicle 10 to shut down in response to receiving an indication of a critical operating condition.

Referring now to FIGS. 7-11, an E-PTO system 600 is shown according to an example embodiment. It should be appreciated that the E-PTO system 600 may be the same or similar to the E-PTO system 100 described above. The E-PTO system 100 is configured to receive electrical power from the batteries 23 or other power sources (e.g., a secondary battery 108 included in the E-PTO system 100, which may be powered/charged via a solar panel, solar photovoltaic generation, solar thermal energy capture device, heat generation from other parts of the refuse, thermos-electric conversion solar cells, magnet mass moving in electrical coils due to road vibration, piezo-electric conversion, etc.) and convert the electrical power to hydraulic power for various hydraulic systems on the refuse vehicle.

Figure 8:
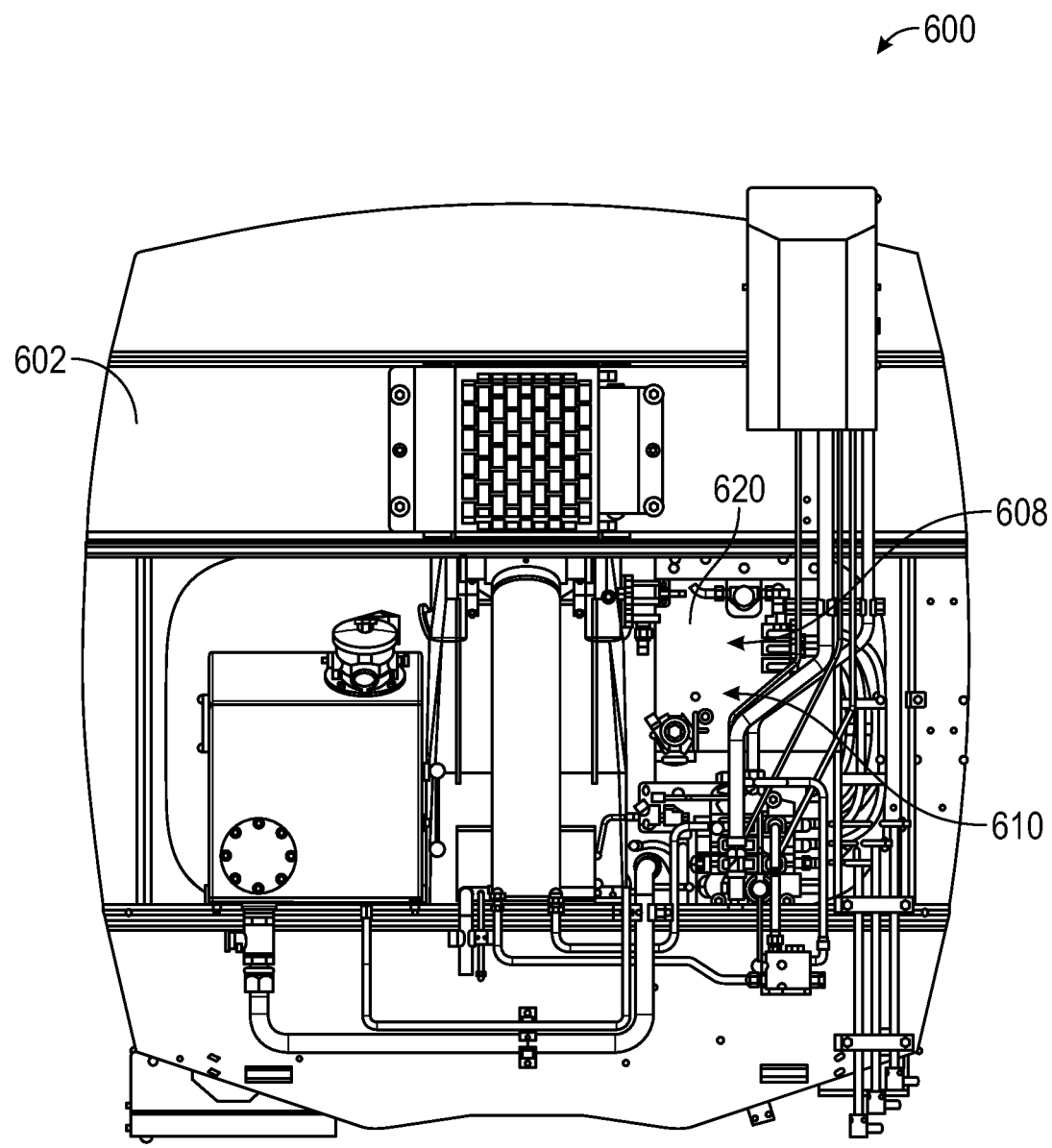
FIG. 8 is a perspective view of the E-PTO system of FIG. 7 according to an example embodiment.
Figure 9:
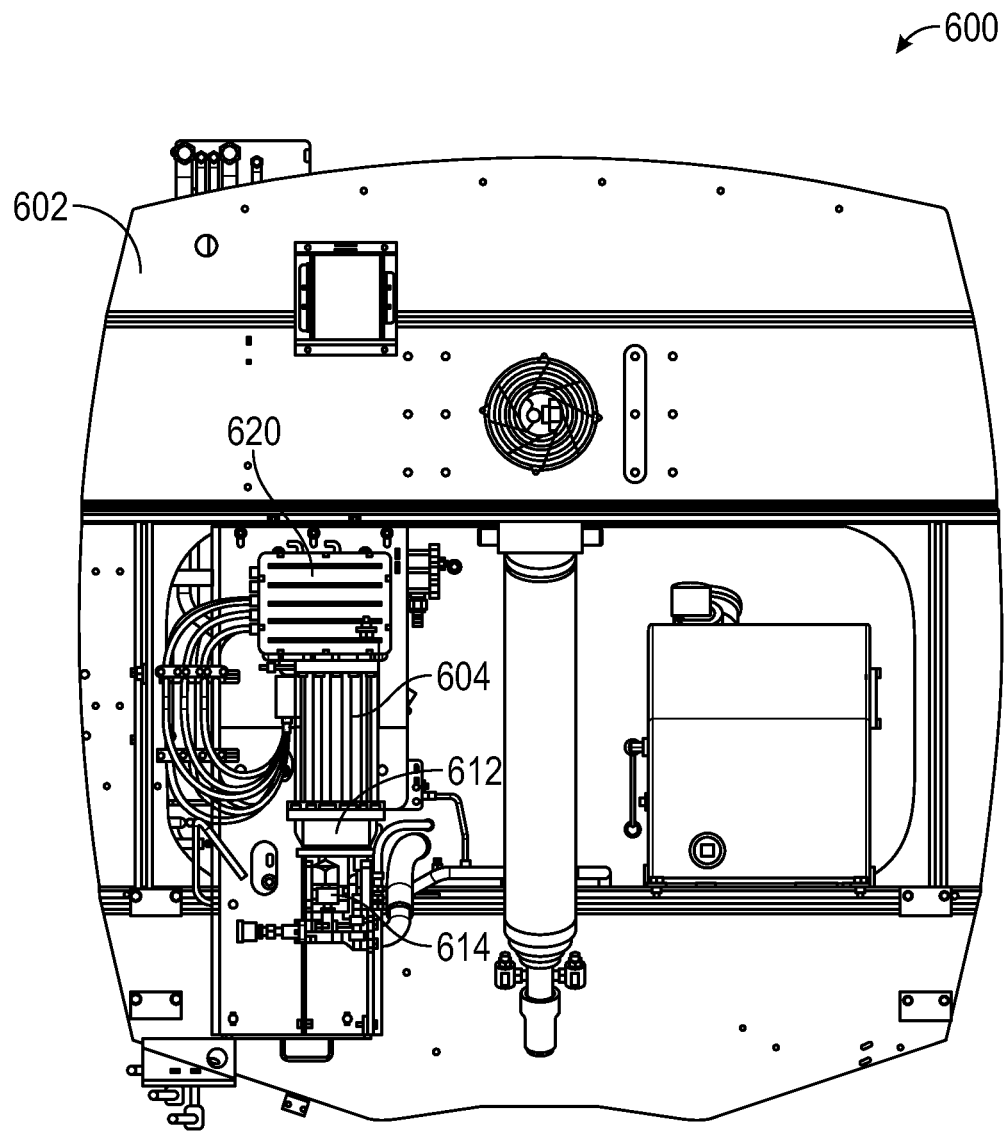
FIG. 9 is a perspective view of the E-PTO system of FIG. 7 according to an example embodiment.
Figure 10:
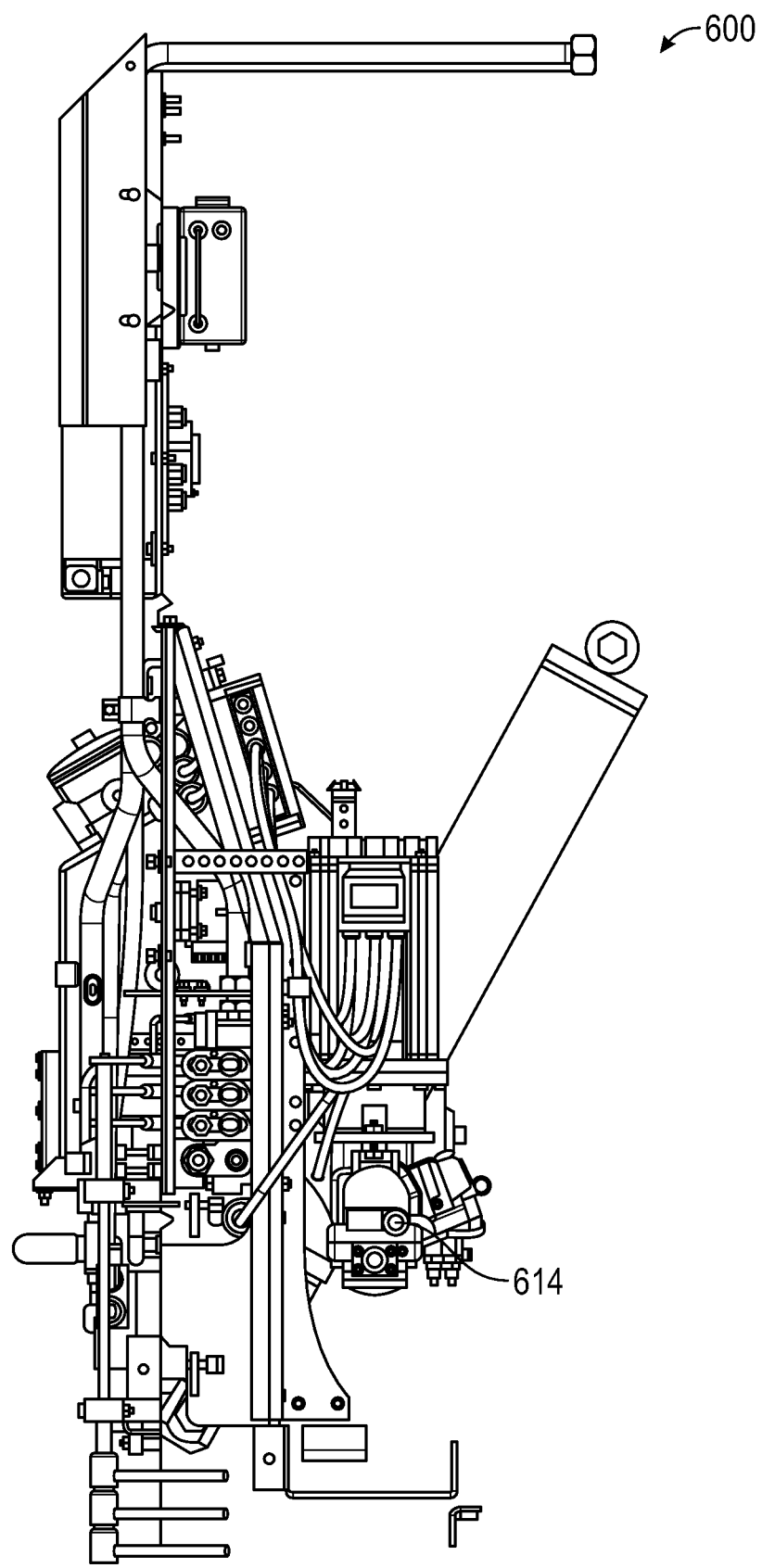
FIG. 10 is a perspective view of the E-PTO system of FIG. 7 according to an example embodiment.
Figure 11:
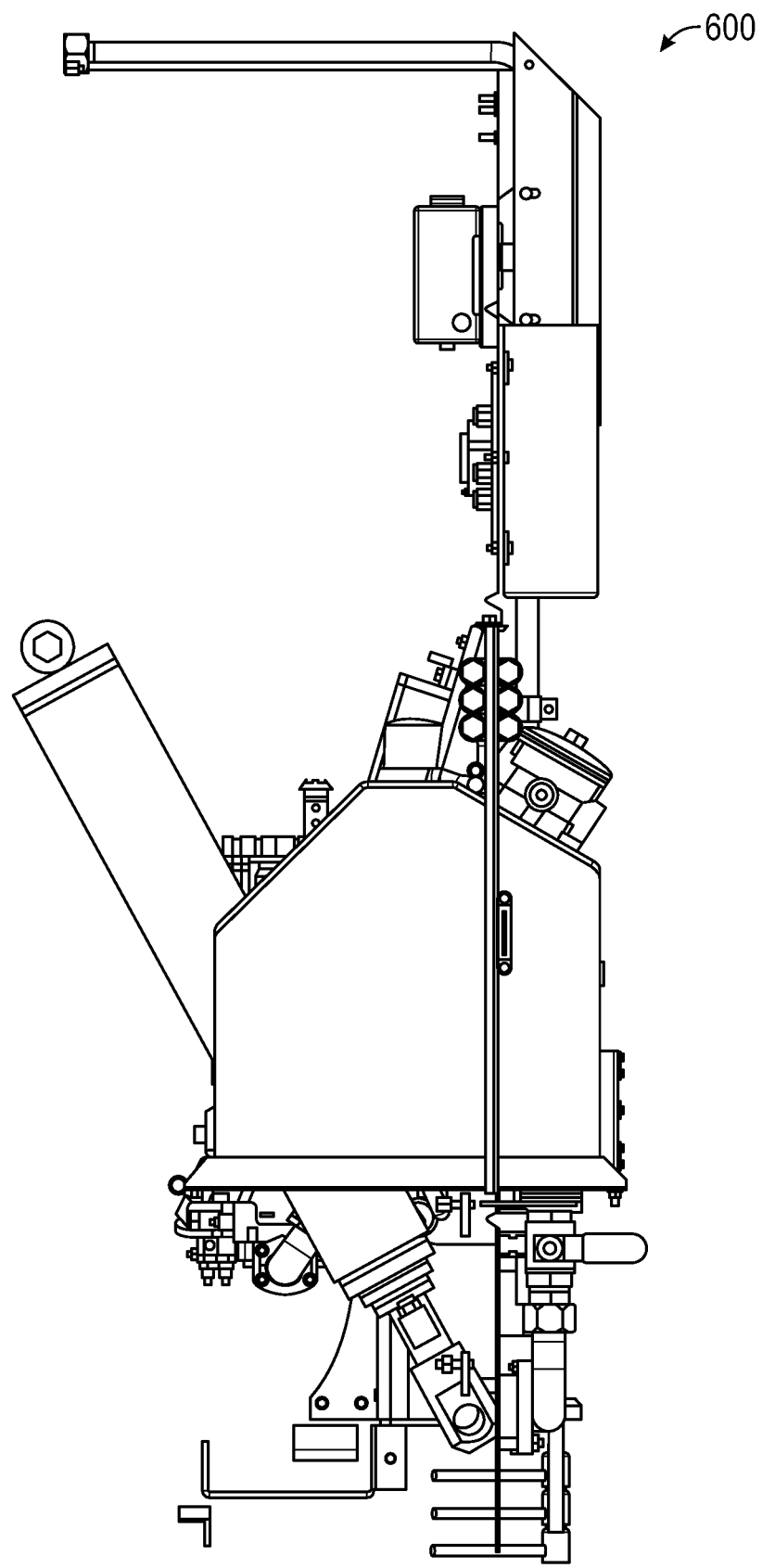
FIG. 11 is a perspective view of the E-PTO system of FIG. 7 according to an example embodiment.

As shown in FIGS. 7-9, the E-PTO system 600 may be contained within E-PTO housing 602. The E-PTO system 600 includes an electric motor 604, a thermal management system 606 (see FIGS. 13-18), a controller 608, an inverter 610 (as pictured, the controller 608 and inverter 610 are contained within the controller housing 620), a coupling mechanism 612, a hydraulic pump 614, a mounting mechanism 616 (see FIG. 12), and hydraulic auxiliary connection points 618.

Figure 12:
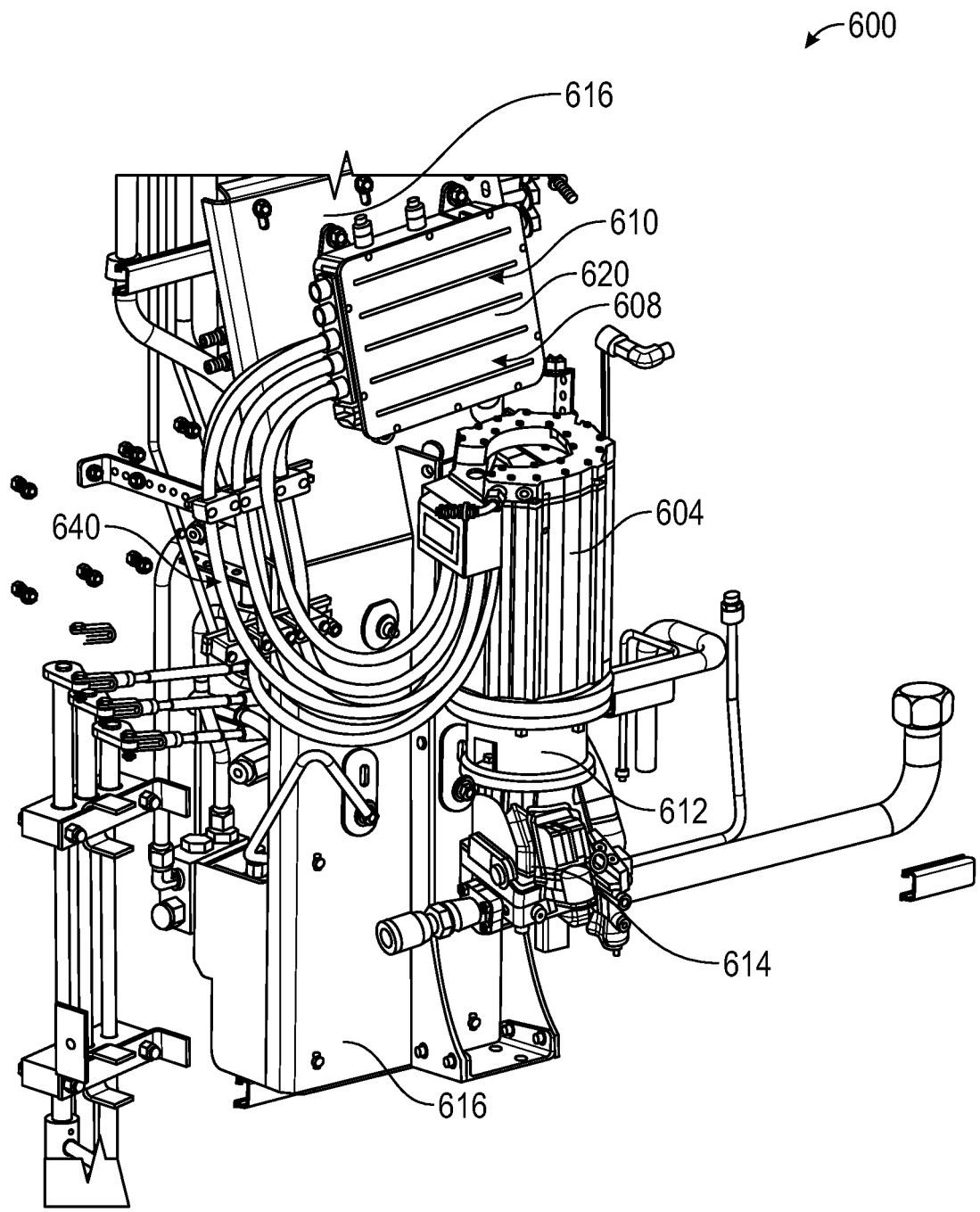
FIG. 12 a partial perspective view of the E-PTO system according to an exemplary embodiment.
Figure 13:
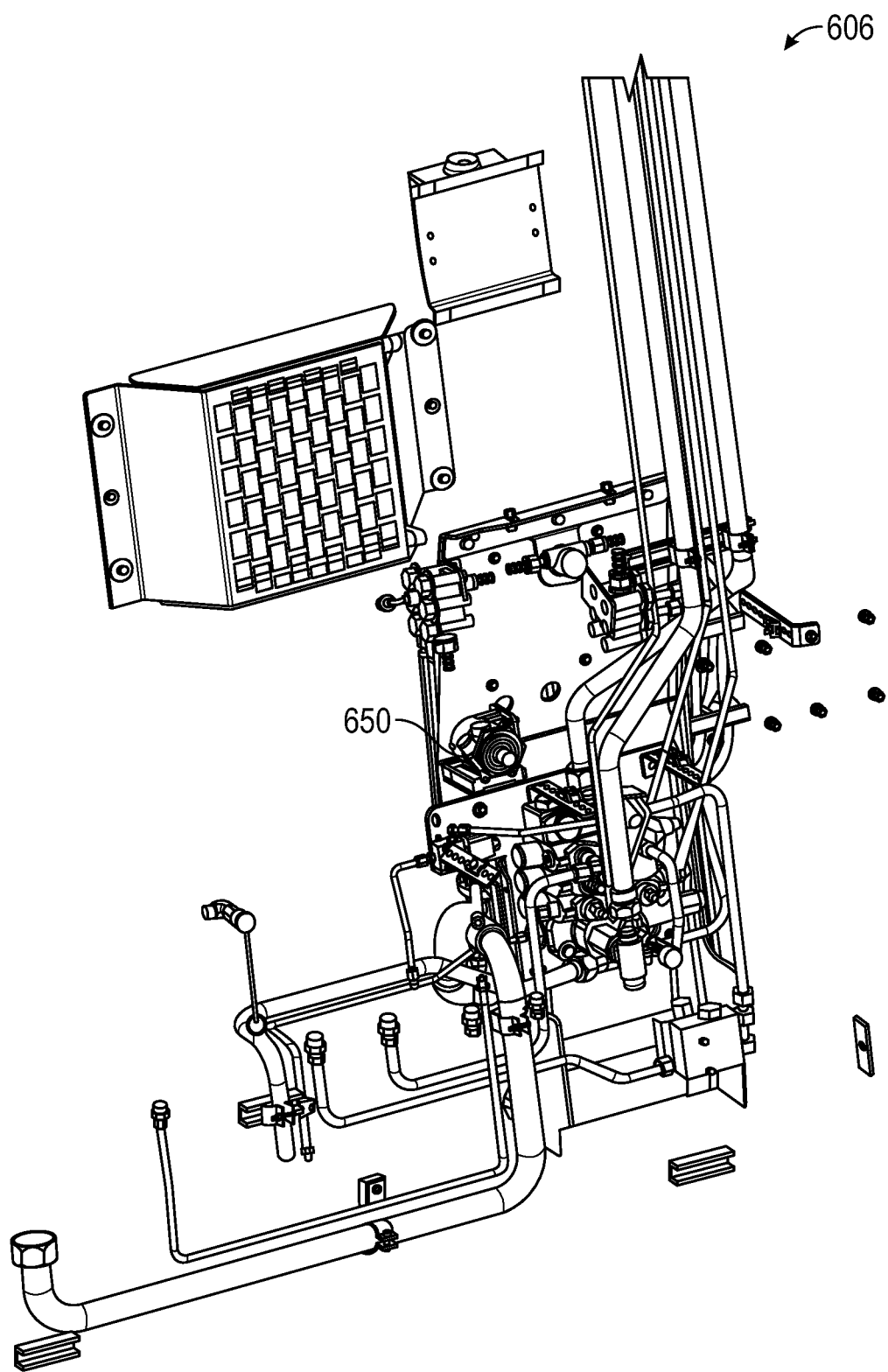
FIG. 13 is a perspective view of a thermal management system according to an example embodiment.
Figure 14:
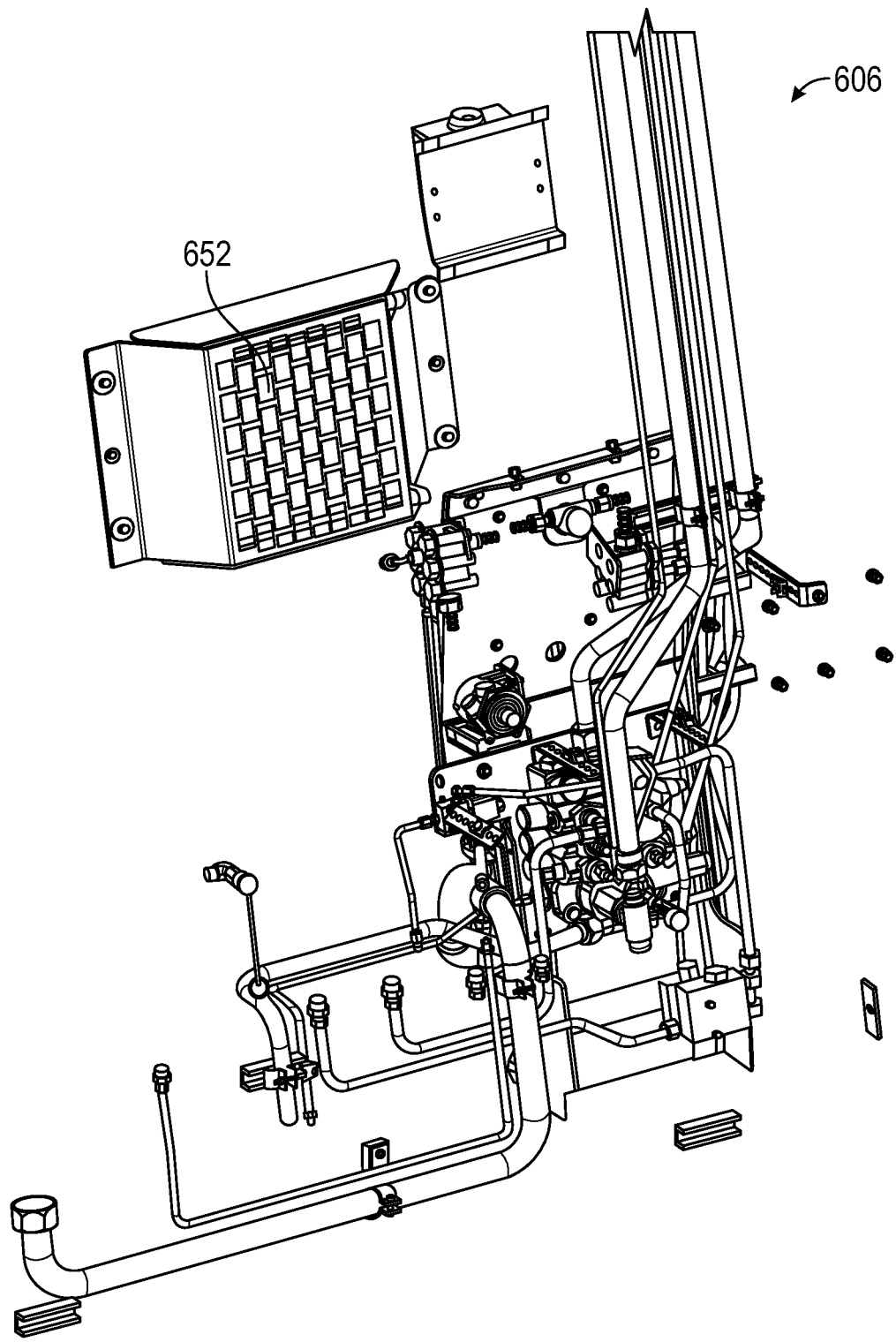
FIG. 14 is a perspective view of the thermal management system of FIG. 13 according to an example embodiment.
Figure 15:
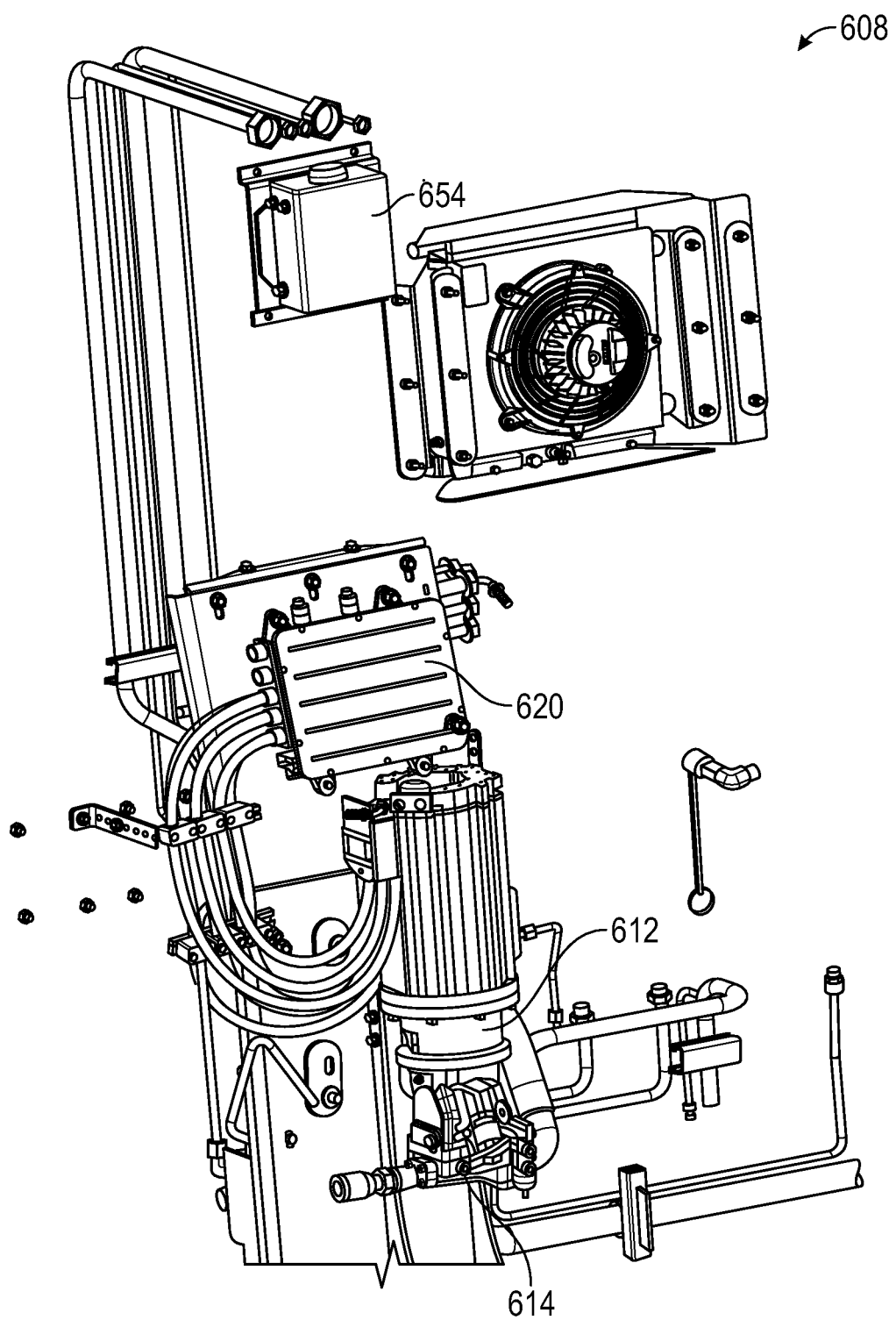
FIG. 15 is a perspective view of the thermal management system of FIG. 13 according to an example embodiment.
Figure 16:
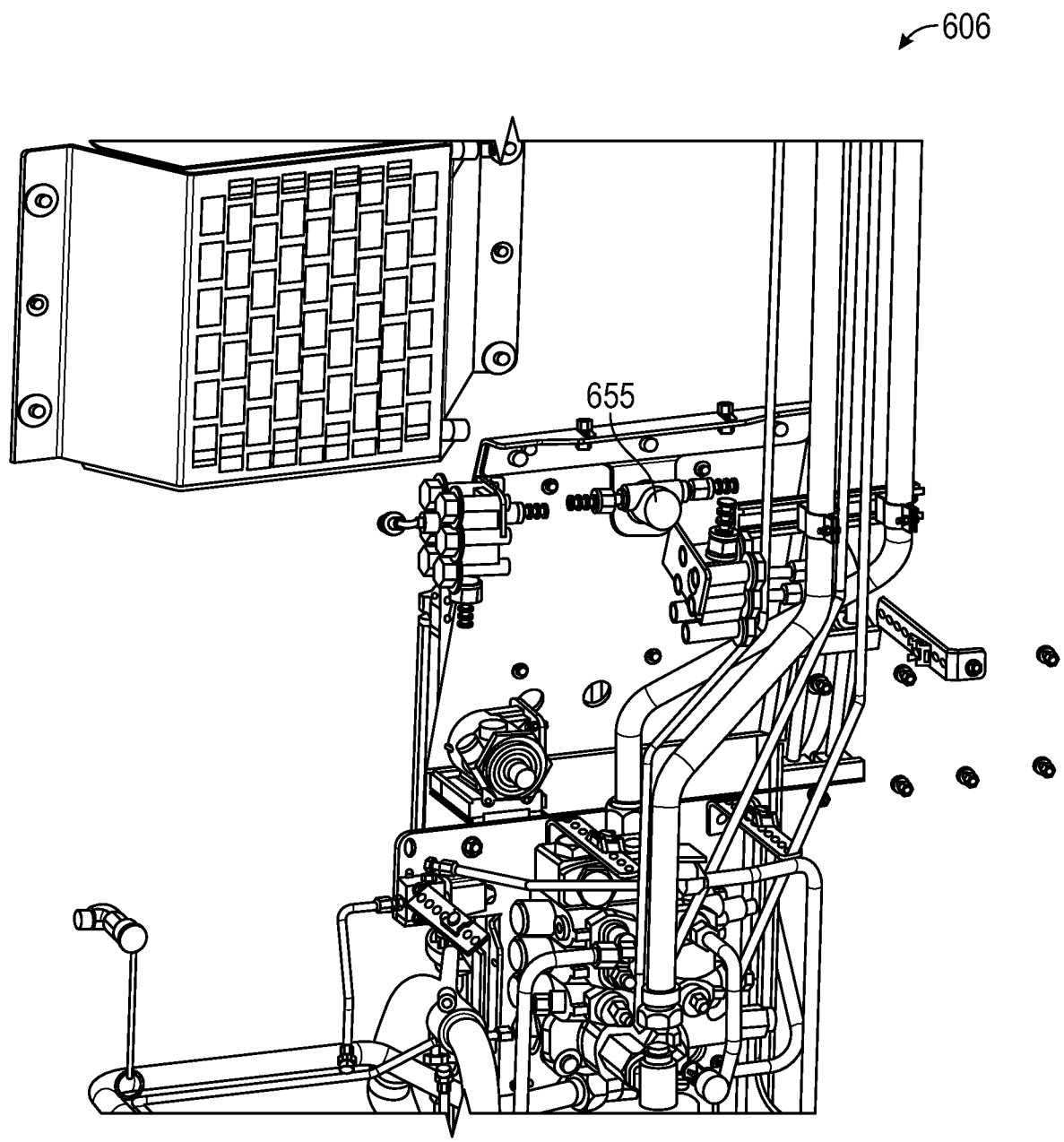
FIG. 16 is a perspective view of the thermal management system of FIG. 13 according to an example embodiment.
Figure 17:
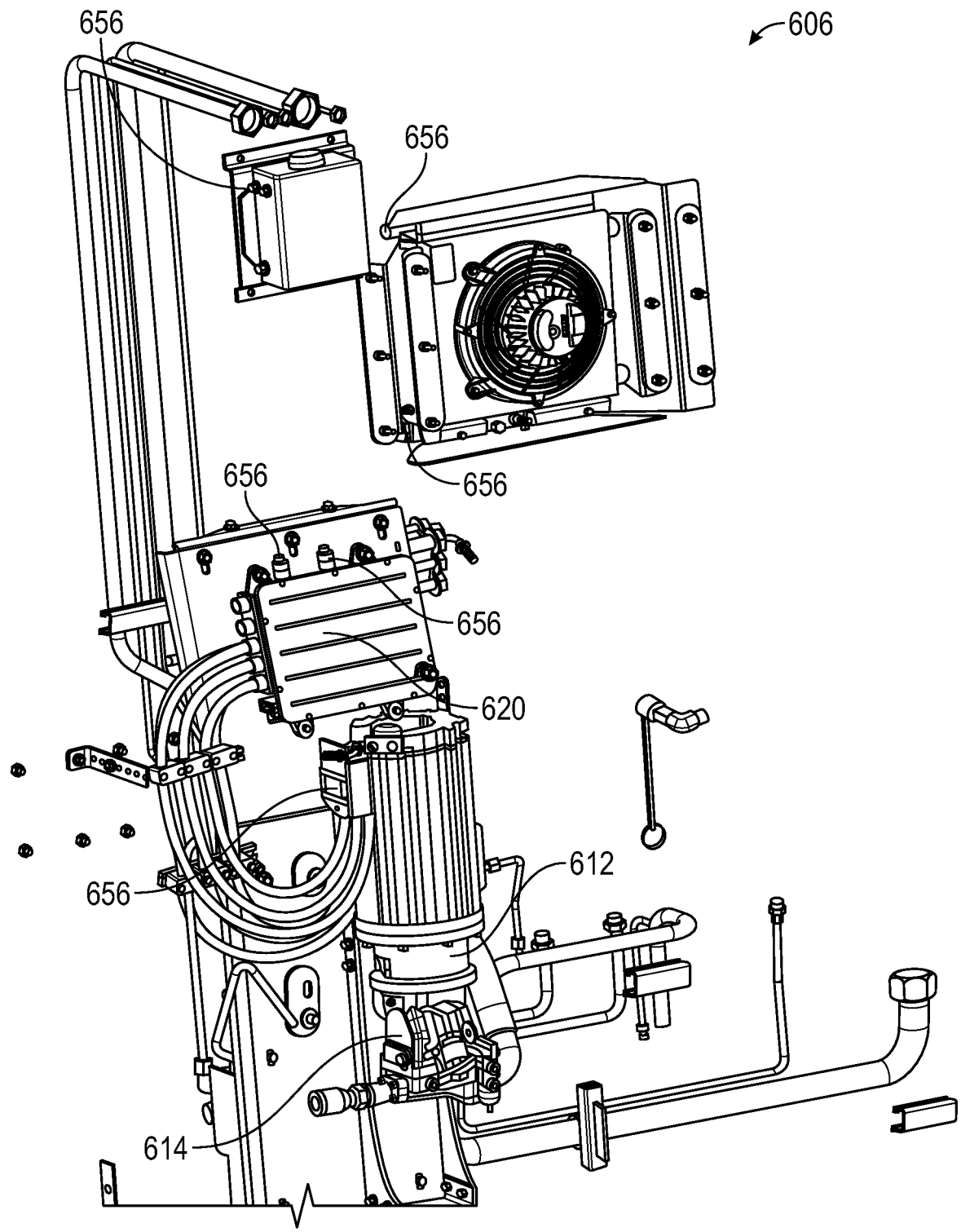
FIG. 17 is a perspective view of the thermal management system of FIG. 13 according to an example embodiment.

Referring now to FIG. 12, a partial perspective view of the E-PTO system 600. As shown, the E-PTO system includes an electric motor 604. The electric motor 604 may be the same or similar to the electric motor 104 described above. The electric motor 604 may be coupled to the controller 608 and the inverter 610. For example, a plurality of cables 640 may connect the inverter 610 to the electric motor, such that the inverter 610 may supply power to the electric motor 604 from the chassis battery 23 and/or a dedicated secondary battery 108. Further, a plurality of cables 640 may connect the controller 608 to the electric motor 604 such that the controller 608 may selectively control the electric motor 604 (e.g., by implementing E-PTO controls process 400). The electric motor 604 is coupled to the hydraulic pump 614 via the coupling mechanism 612 such that the electric motor 604 may cause the hydraulic pump 614 to provide pressure to various hydraulic system within the refuse vehicle (e.g., lifting system 30, the compactor 50, and any subsystems 106).

Referring now to FIGS. 13-17, a perspective view of the thermal management system 606 is shown according to an example embodiment. For example, the thermal management system 606 may be included in the E-PTO system 600. The thermal management system 606 may include a cooling circuit configured to cool the inverter 610. The thermal management system 606 may further be configured to cool other components of the refuse vehicle 10, according to some embodiments. The thermal management system 606 may be the same or similar to the heat dissipation device 112 described above. As shown, the thermal management system 606 includes a thermal fluid pump 650 coupled to a thermal exchanger 652 and a thermal fluid reservoir 654. For example, the thermal fluid pump 650 may be coupled to the thermal exchanger 652 and the thermal fluid reservoir 654 via a plurality of conduits such that cooling fluid may be exchanged between the components thereby creating the cooling circuit. The thermal fluid reservoir 654 may also include one or more level switches 658 (e.g., a capacitive, conductive, diaphragm, displace, float, inductive, optical, paddle, vibrating rod, tilt, and/or tuning for level switch). The level switch 658 may be configured to detect a maximum and/or minimum cooling fluid level in the thermal fluid reservoir 654. The level switch 658 may also by coupled to the controller 608 such that the controller 608 may receive data from the level switch 658. For example, if the level switch 658 detects a maximum fluid level, the controller 608 may send operating parameters to the thermal fluid pump 650 in response, wherein the operating parameters cause the thermal fluid pump 650 to pump more cooling fluid into the cooling circuit to reduce the amount of cooling fluid in the thermal fluid reservoir. In another example, if the level switch 658 detects a minimum fluid level, the controller 608 may send operating parameters to various components to shut down components, as a lack of cooling fluid may be indicative of a critical operating condition. The thermal fluid pump 650 is configured to pump cooling fluid through the cooling circuit. For example, cooling fluid may be stored in the thermal fluid reservoir 654 and the thermal fluid pump 650 may pump the cooling fluid to the inverter 610 (e.g., through a plurality of conduits). Excess heat in the inverter 610 may then be transferred to the cooling fluid. The thermal fluid pump 650 may continue to pump the cooling fluid to the thermal exchanger 652 after the inverter 610. Some or all of the excess heat from the inverter 610 may then be exchanged by the thermal exchanger 652 into the surrounding environment, thereby cooling the inverter 610.

In certain embodiments, the thermal fluid pump 650 is further coupled to the inverter 610 and the controller 608 such that the thermal fluid pump 650 may receive power from the inverter 610 and may be controlled by the controller 608. For example, the controller 608 may provide operating parameters to the thermal fluid pump 650, which may cause the thermal fluid pump 650 pump cooling fluid at different rates. The thermal management system 606 may also include one or more flow meters 655 and a plurality of thermal sensors 656. The flow meters 655 and thermal sensors 656 may be coupled to the controller 608 such that the controller 608 may perform feedback control of the thermal management system 606. For example, the flow meters 655 and the thermal sensors 656 may be the same or similar as the sensors 350 described above with reference to FIG. 6a. In other words, the flow meters 655 may be configured to measure the fluid flow rate of the cooling fluid through the conduits and the thermal sensors 656 may be configured to measure the temperature at various points in the cooling circuit, including the inverter such that the controller 608 may cause the thermal fluid pump 650 to pump sufficient cooling fluid to the inverter and/or shut down the system in response to detecting critical operating conditions.

Figure 18:
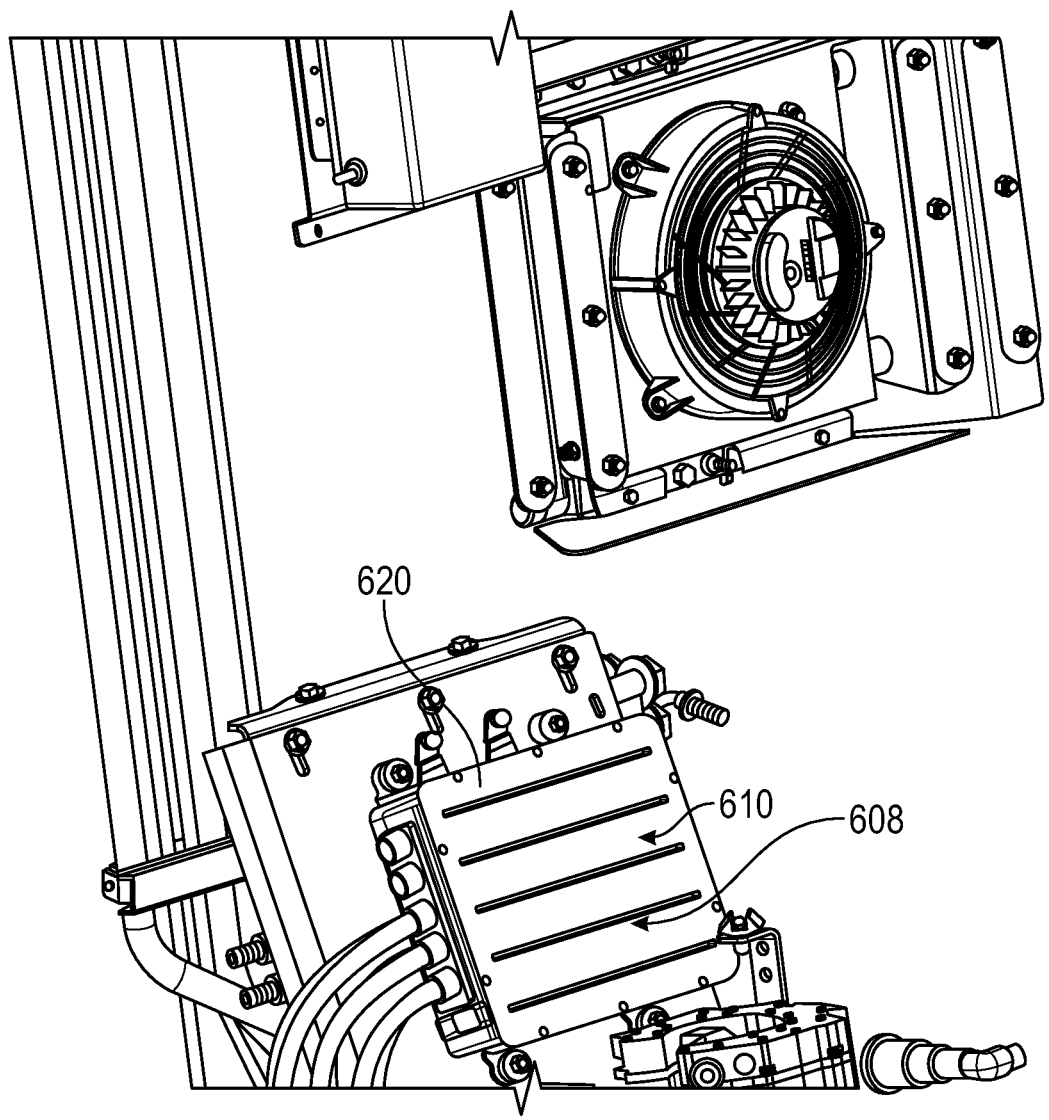
FIG. 18 is a perspective view of an inverter and a controller according to an example embodiment.

Referring now to FIG. 18, a perspective view of the inverter 610 and the controller 608 are shown according to an example embodiment. As shown, the inverter 610 and controller 608 are located within the controller housing 620. In certain embodiments, the inverter 610 and the controller 608 may be the same or similar to the inverter 110 and the E-PTO controller 320 discussed above.

As shown, the controller housing 620 may include a multi-port module, thereby enabling the controller housing 620 to be used in several different situations. The controller 608 may utilize a Control Area Network (CAN) bus to allow an internal microprocessor (e.g., the processor 304) to communicate without other systems without a centralized host computer. The controller housing 620 may also include a fuse box to protect the controller 608 a thermal fan to help cool the controller 608 and the inverter 610. The controller housing 620 may be in thermal communication with the cooling circuit described above, such that the thermal management system 606 may cool the controller 608 and the inverter 610.

Figure 19:
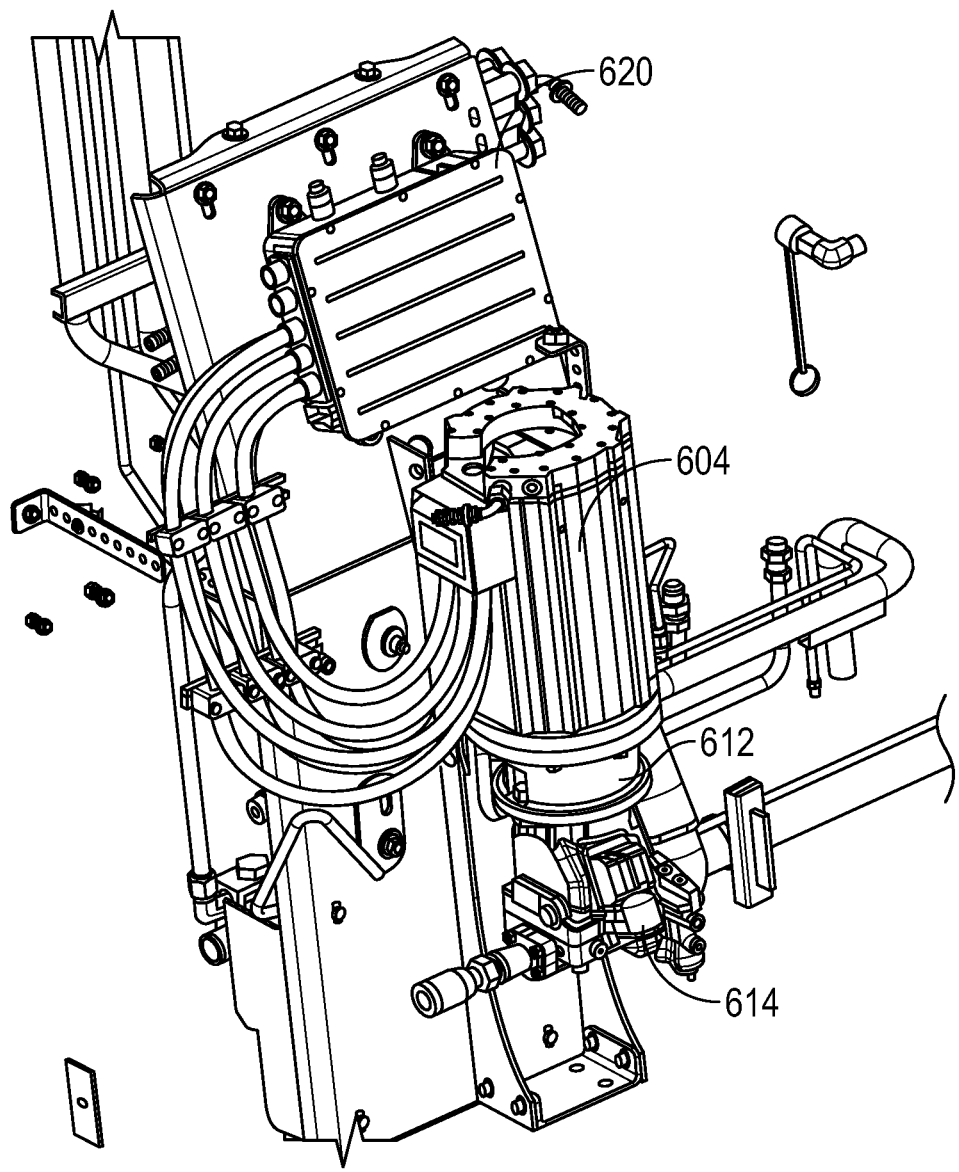
FIG. 19 is a perspective view of a coupling mechanism according to an example embodiment.
Figure 20:
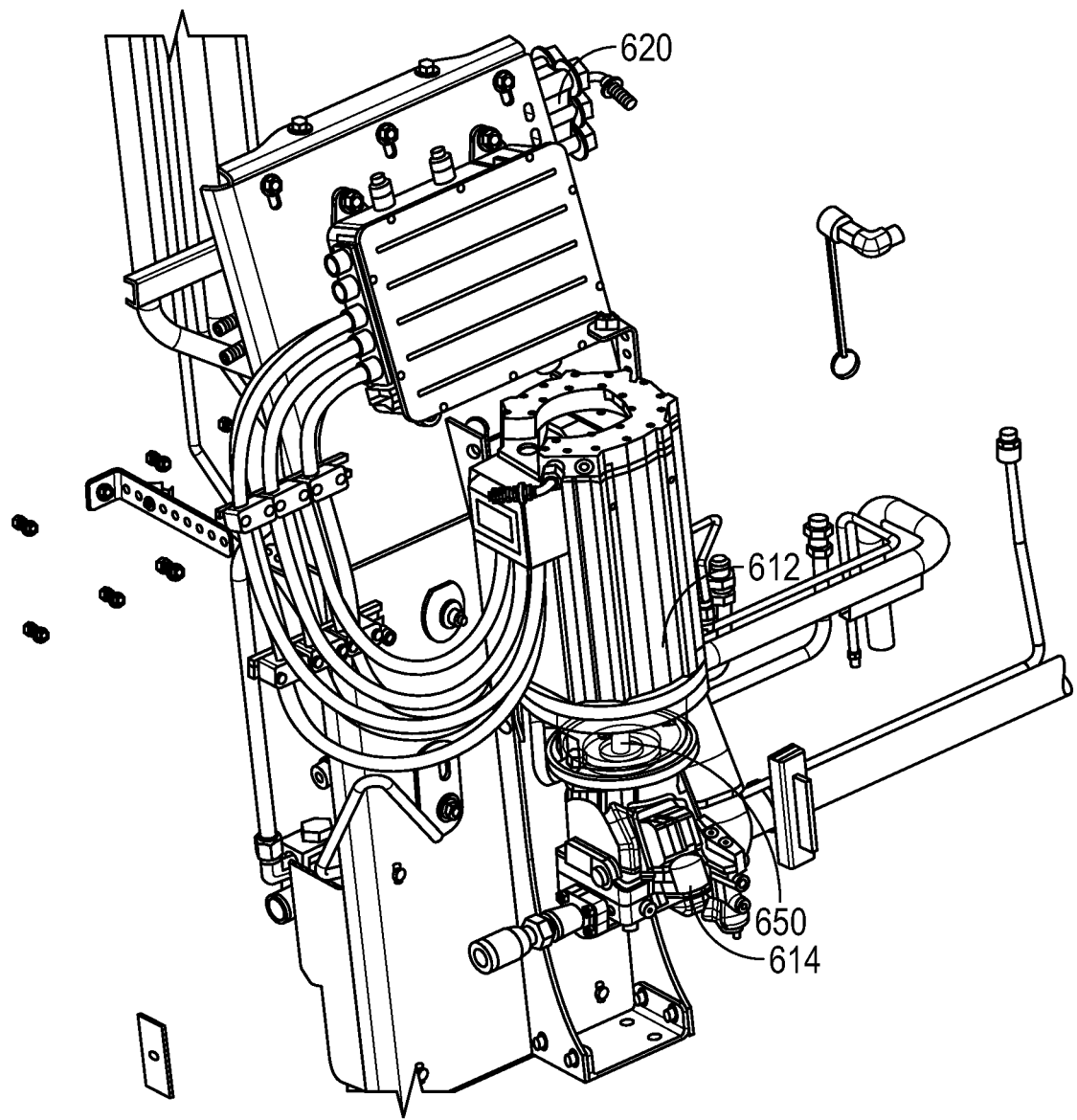
FIG. 20 is a perspective view of the coupling mechanism of FIG. 19 according to an example embodiment.

Referring now to FIGS. 19 and 20, a perspective view of the coupling mechanism 612 is show according to an example embodiment. The coupling mechanism 612 may be used to structurally couple the electric motor 604 to the hydraulic pump 614. As shown in FIG. 20, an energy transfer component 660 is included in the coupling mechanism 612. The energy transfer component 660 may be used to transfer a mechanical output from the electric motor 604 to a mechanical input for the hydraulic pump 614. For example, the energy transfer component 660 may include a transmission, a clutch, a splined shaft, a gear box, etc.

Figure 21:
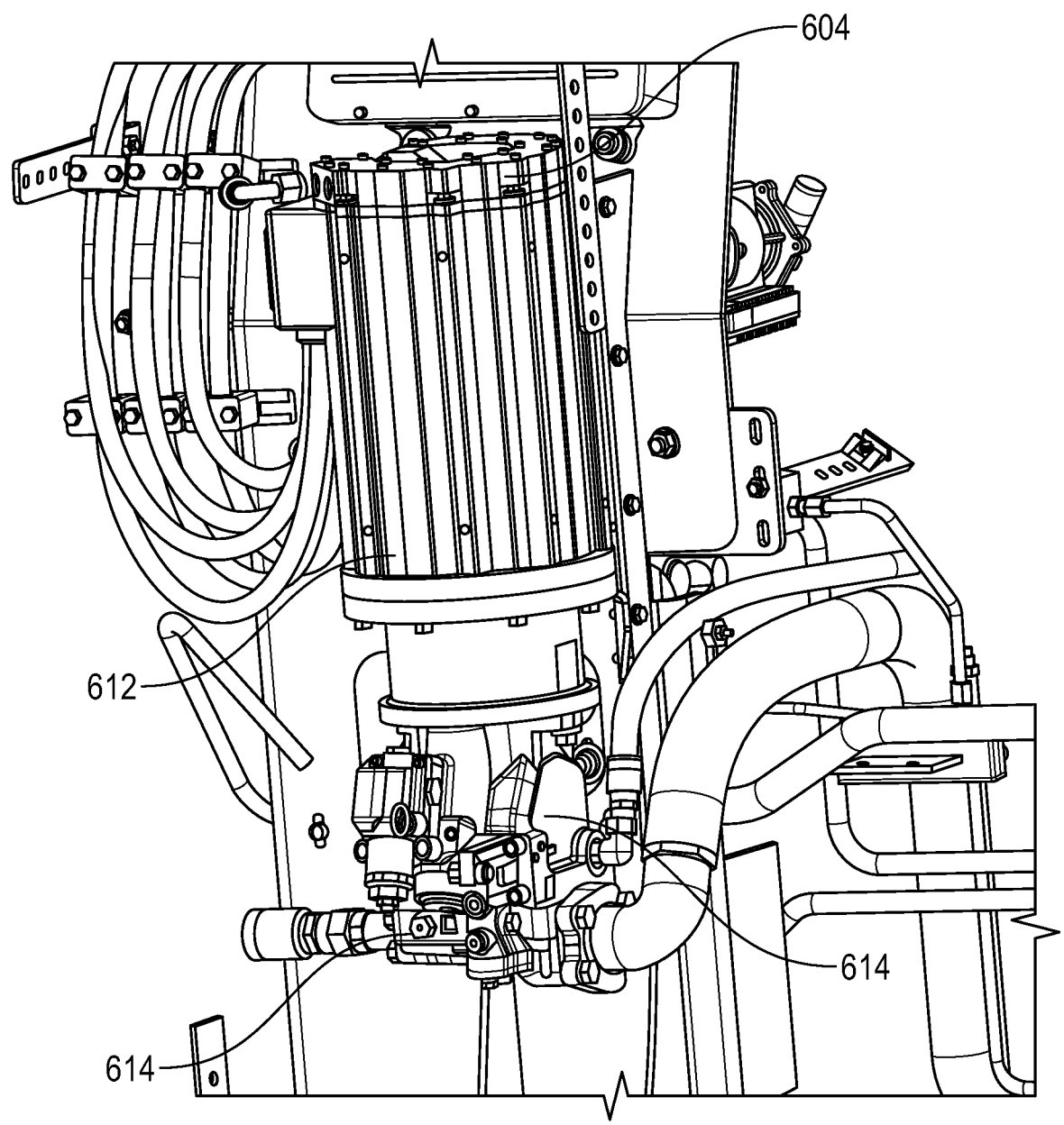
FIG. 21 is a perspective view of a hydraulic pump according to an example embodiment.

Referring now to FIG. 21, a perspective view of the hydraulic pump 614 is shown according to an example embodiment. The hydraulic pump 614 may be the same or similar to the hydraulic pump 102 described above.

Figure 22:
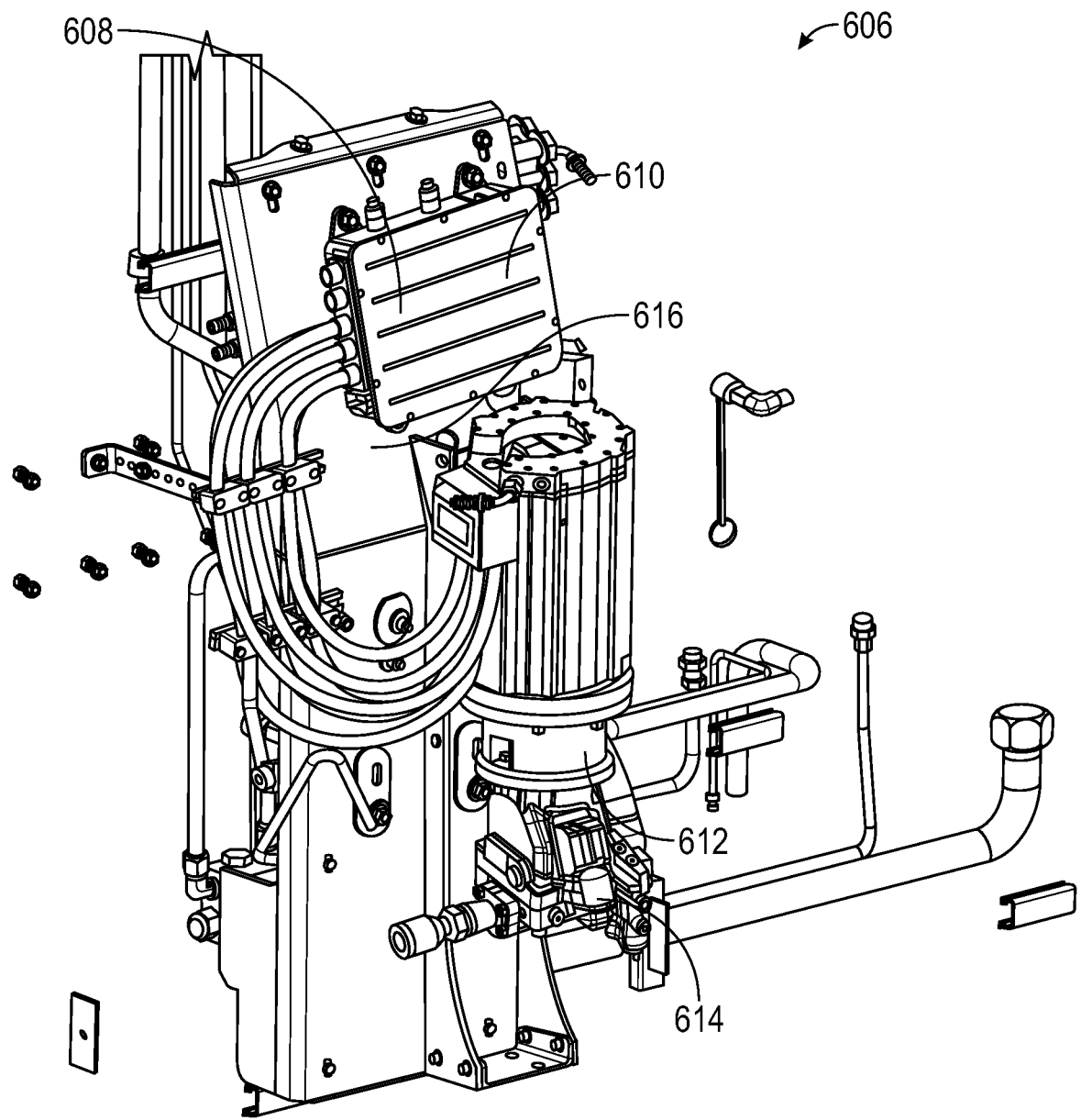
FIG. 22 is a perspective view of a mounting mechanism according to an example embodiment.
Figure 23:
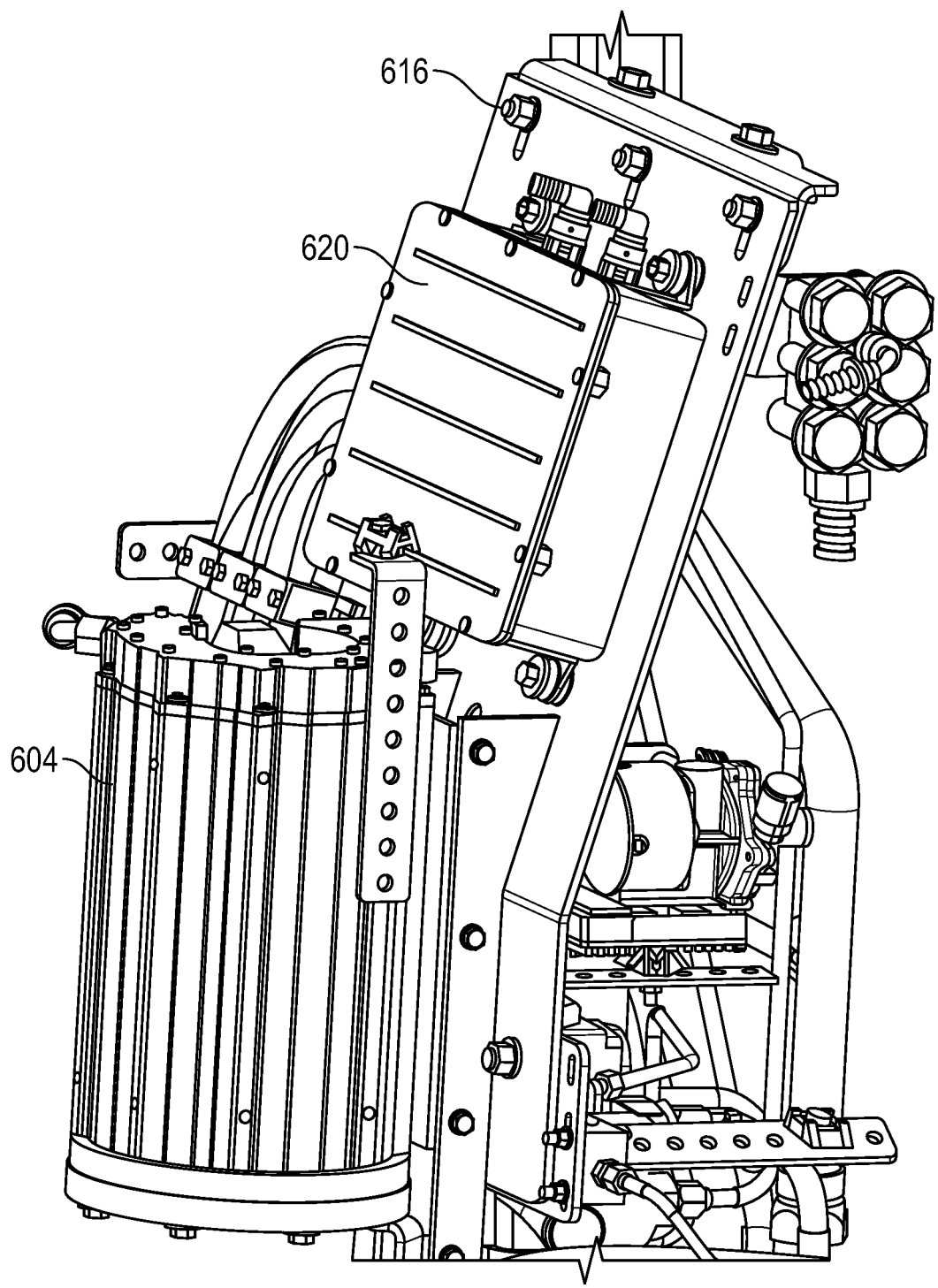
FIG. 23 is a perspective view of the mounting mechanism of FIG. 22 according to an example embodiment.

Referring now to FIGS. 22 and 23, a perspective view of the mounting mechanism 616 is shown according to an example embodiment. The mounting mechanism may be used to mount the E-PTO system 600 to various areas of the refuse vehicle 10. For example, the E-PTO system 600 may be mounted on the front of the body 14, inside the body 14, on the back of the body 14, under the body, to the frame 12, or anywhere else the body of the refuse vehicle 10.

Figure 24:
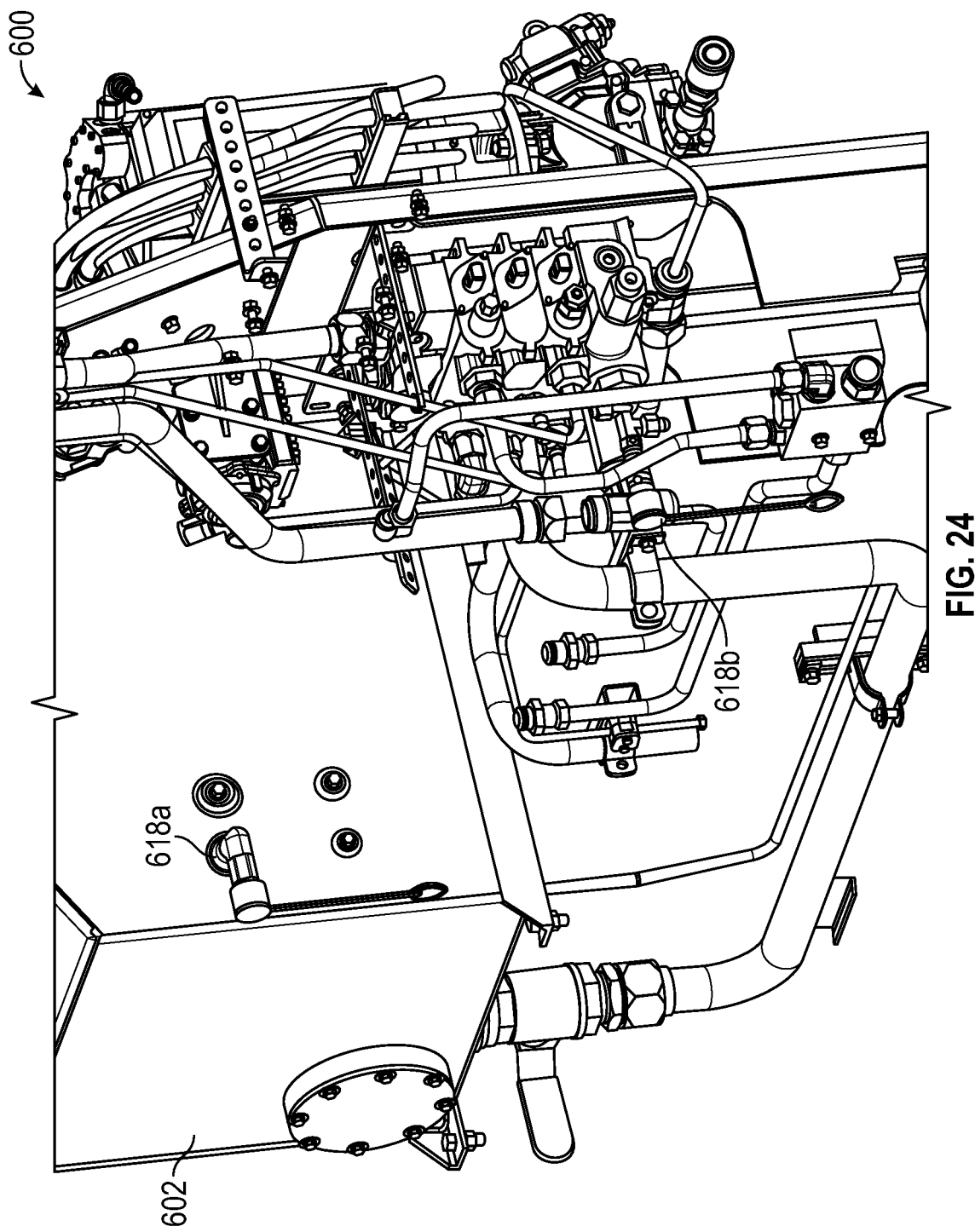
FIG. 24 is a perspective view of a hydraulic auxiliary connection points according to an example embodiment.

Referring now to FIG. 24, a perspective view of the hydraulic auxiliary connection points 618 is shown according to an example embodiment. As shown, the E-PTO system 600 incudes a first auxiliary connection point 618*a* and a second auxiliary connection point 618*b*. For example, various systems may be connected to the auxiliary connection points 618 such that hydraulic pressure may be supplied to those systems. For example, a piece of equipment not included in the refuse vehicle 10 may be connected to the auxiliary connection points 618. Further, the auxiliary connection points 618 may be used as a secondary hydraulic circuit and/or emergency backup if the main hydraulic circuit fails. In certain embodiments, an auxiliary pump system may be connected to the auxiliary connection points 618, as is discussed below.

Figure 25:
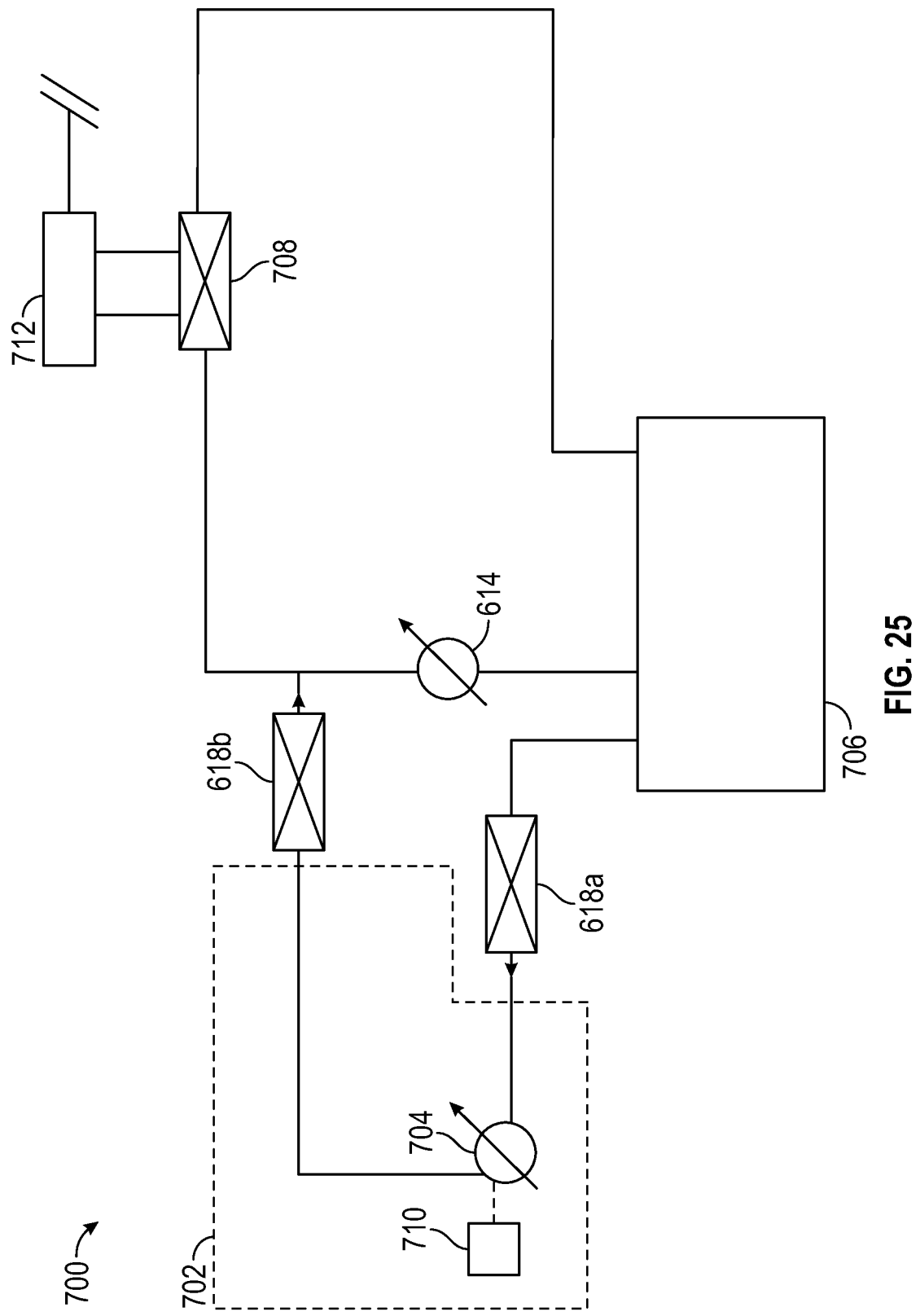
FIG. 25 is a schematic view of a hydraulic auxiliary connection point circuit according to an example embodiment.

Referring now to FIG. 25, a schematic view of the hydraulic auxiliary connection point circuit 700 is shown according to an example embodiment. The auxiliary connection point circuit 700 includes the first and second auxiliary connection points 618*a*, 618*b*. Further, the auxiliary connection point circuit 700 includes an auxiliary pump circuit 702 that can be connected to the auxiliary connection points 618. The auxiliary pump circuit 702 includes an auxiliary hydraulic pump 704 that is powered by an auxiliary power supply 710 (e.g., a secondary battery 108). Once connected, the first auxiliary connection point 618*a* may be opened, thereby connecting the auxiliary pump circuit 702 to a hydraulic fluid reservoir 706. For example, the hydraulic fluid reservoir 706 may also be in fluid communication with the primary hydraulic pump 614. The auxiliary hydraulic pump 704 may then receive hydraulic fluid from the first auxiliary connection point 618*a* and pump hydraulic fluid through the second auxiliary connection point 618*b*, through an output valve 708 and to a system 712 (e.g., lift system 30, compactor 50, subsystems 106, etc.) of the refuse vehicle 10.

Figure 26:
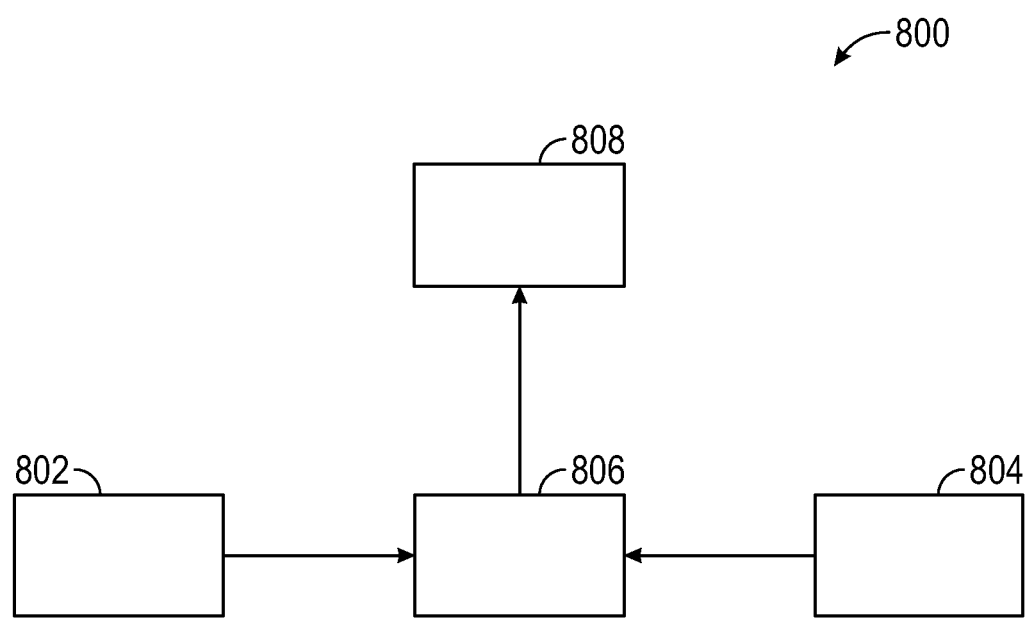
FIG. 26 is a schematic diagram of an efficiency controller system according to an example embodiment

Referring now to FIG. 26, a schematic diagram of an efficiency controller system 800 is shown according to an example embodiment. The efficiency controller system 800 may include a refuse body input 802, a chassis body input 804, a controller 806, and a controller analysis output 808. In certain embodiments, the refuse body input 802 includes energy consumption information from the refuse body (e.g., from the E-PTO system 100). The chassis body input 804 includes energy consumption information from the chassis body (e.g., the battery 23, the prime mover 20, etc.). The controller 806 may be the similar to the controller 320. The controller 806 may output information to the controller analysis output 808 which may then display valuable information to an operator (e.g., via a user interface).

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the electromechanical variable transmission as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:
a chassis supporting a plurality of wheels;
a battery configured to provide electrical power to selectively drive at least one of the plurality of wheels;
a vehicle body supported by the chassis and defining a receptacle for storing refuse therein; and
an electric power take-off system coupled to one of the chassis or the vehicle body, the electric power take-off system including:
a motor configured to convert electrical power received from the battery into hydraulic power,
an inverter configured to provide electrical power to the motor from the battery;
a heat dissipation device in thermal communication with the inverter;
a thermal sensor configured to generate sensor data indicative of a thermal condition of at least one of the inverter or the heat dissipation device; and
a controller configured to:
receive the sensor data from the thermal sensor; and
decrease the hydraulic power provided by the electric power take-off system in response to determining that the sensor data from the thermal sensor exceeds a critical operating condition.

2. The refuse vehicle of claim 1, wherein the electric power take-off system further includes a second battery, such that the electric power take-off system is configured to operate independently of the battery.

3. The refuse vehicle of claim 2, further comprising a solar panel configured to provide power to the second battery.

4. The refuse vehicle of claim 1, wherein the heat dissipation device is a radiator.

5. The refuse vehicle of claim 1, wherein the heat dissipation device includes a thermal fluid pump in fluid communication with a cooling fluid reservoir.

6. The refuse vehicle of claim 5, wherein the cooling fluid reservoir includes a level switch in communication with the controller, wherein the level switch is configured to detect a minimum cooling fluid level and the controller is configured to decrease the hydraulic power provided by the electric power take-off system in response to the minimum cooling fluid level being detected.

7. The refuse vehicle of claim 1, wherein the thermal sensor includes at least one thermocouple.

8. A method comprising:
providing power to one or more components of a system of a refuse vehicle, the refuse vehicle comprising:
a chassis supporting a plurality of wheels;
a battery configured to provide electrical power to drive at least one of the plurality of wheels;
a vehicle body supported by the chassis and defining a receptacle for storing refuse therein; and
an electric power take-off system coupled to the vehicle body, the electric power take-off system including:
a motor configured to convert electrical power received from the battery into hydraulic power,
an inverter configured to provide electrical power to the motor from the battery;
a heat dissipation device in thermal communication with the inverter;
a thermal sensor configured to generate sensor data indicative of a thermal condition of at least one of the inverter or the heat dissipation device; and
a controller configured to receive the sensor data from the thermal sensor;
receiving, by the controller, the sensor data from the thermal sensor; and
decreasing, by the controller, the hydraulic power provided by the electric power take-off system in response to determining the sensor data received exceeds a critical operating condition.

9. The method of claim 8, wherein the one or more components of the system includes the electric power take-off system.

10. The method of claim 8, further comprising providing, by the controller, initial operating parameters to the heat dissipation device that define a specific power input into a thermal fluid pump of the heat dissipation device.

11. The method of claim 8, wherein receiving the sensor data includes receiving data indicative of a temperature of at least one of the inverter or the heat dissipation device.

12. The method of claim 8, wherein the electric power take-off system further includes a second battery, such that the electric power take-off system is configured to operate independently of the battery.

13. The method of claim 12, wherein the second battery is powered by a solar panel attached to the vehicle body.

14. The method of claim 8, wherein the heat dissipation device is a radiator.

15. The method of claim 8, further comprising determining, by the controller, a location of the critical operating condition.

16. The method of claim 15, further comprising:
detecting, by a level switch in a cooling fluid reservoir of the heat dissipation device, a minimum cooling fluid level; and
decreasing, by the controller, the hydraulic power provided by the electric power take-off system in response to the minimum cooling fluid level being detected.

17. The method of claim 8, further comprising shutting down, by the controller, the electric power take-off system in response to determining that the sensor data exceeds the critical operating condition.

18. An electric power take-off system, comprising:
a motor configured to convert electrical power received from a battery into hydraulic power;
an inverter configured to provide electrical power to the motor from the battery,
a heat dissipation device in thermal communication with the inverter;

a thermal sensor configured to generate sensor data indicative of a thermal condition of at least one of the inverter or the heat dissipation device; and a controller configured to:
receive the sensor data from the thermal sensor; and
decrease the hydraulic power provided by the electric power take-off system in response to determining that the sensor data from the thermal sensor exceeds a critical operating condition.

19. The electric power take-off system of claim 18, wherein the battery is powered by a solar panel coupled to the electric power take-off system.

20. The electric power take-off system of claim 18, wherein the heat dissipation device includes a thermal fluid pump in fluid communication with a cooling fluid reservoir.

* * * * *